(12) United States Patent
Michiyama et al.

(10) Patent No.: US 11,861,360 B2
(45) Date of Patent: Jan. 2, 2024

(54) MANAGEMENT METHOD, MANAGEMENT APPARATUS, AND PROGRAM

(71) Applicant: Panasonic Intellectual Property Corporation of America, Torrance, CA (US)

(72) Inventors: Junji Michiyama, Fukuoka (JP); Junichiro Soeda, Nara (JP); Yuji Unagami, Osaka (JP); Yuuki Hirose, Osaka (JP); Tetsuji Fuchikami, Osaka (JP); Motoji Ohmori, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/557,402

(22) Filed: Dec. 21, 2021

(65) Prior Publication Data
US 2022/0113963 A1    Apr. 14, 2022

Related U.S. Application Data

(63) Continuation of application No. 16/441,744, filed on Jun. 14, 2019, now Pat. No. 11,237,823.
(Continued)

(30) Foreign Application Priority Data

Mar. 29, 2019   (JP) ................... 2019-065324

(51) Int. Cl.
*G06F 8/71*        (2018.01)
(52) U.S. Cl.
CPC ..................... *G06F 8/71* (2013.01)

(58) Field of Classification Search
CPC ....................................................... G06F 8/71
See application file for complete search history.

(56) References Cited

U.S. PATENT DOCUMENTS 8,170,937 B1 * 5/2012 Nathanson ......... G06Q 30/0275
705/35
8,414,390 B1 * 4/2013 Paleja ................... A63F 13/358
463/43

(Continued)

FOREIGN PATENT DOCUMENTS

JP    2014-203352    10/2014
WO    2016/007904    1/2016

OTHER PUBLICATIONS

Extended European Search Report dated Nov. 13, 2019 in corresponding European Patent Application No. 19180155.4.
(Continued)

*Primary Examiner* — Douglas M Slachta
(74) *Attorney, Agent, or Firm* — Wenderoth, Lind & Ponack, L.L.P.

(57) ABSTRACT

The present disclosure provides a management method for software versions to improve transaction safety of software. In the management method, among management apparatuses, a first token management apparatus obtains request information indicating a requested version requested by a user, and first transaction data indicating that the user provides predetermined number of tokens to a software developer who has developed the requested version is stored in distributed ledgers through execution of a consensus algorithm by the management apparatuses.

9 Claims, 29 Drawing Sheets

Related U.S. Application Data

(60) Provisional application No. 62/686,329, filed on Jun. 18, 2018.

(56) References Cited

U.S. PATENT DOCUMENTS

| | | | | |
|---|---|---|---|---|
| 8,645,685 | B2* | 2/2014 | Nguyen | G07F 17/32 |
| | | | | 726/16 |
| 9,232,077 | B2* | 1/2016 | Yu | H04L 67/306 |
| 10,365,922 | B1 | 7/2019 | Wang | |
| 10,438,290 | B1 | 10/2019 | Winklevoss | |
| 10,929,842 | B1 | 2/2021 | Arvanaghi | |
| 2008/0183591 | A1* | 7/2008 | Olsson | G06Q 30/06 |
| | | | | 705/26.1 |
| 2012/0303491 | A1* | 11/2012 | Hill | G06Q 30/0601 |
| | | | | 705/27.2 |
| 2013/0097698 | A1* | 4/2013 | Taveau | G06F 21/57 |
| | | | | 726/19 |
| 2013/0311356 | A1* | 11/2013 | Ho | G06Q 20/123 |
| | | | | 705/39 |
| 2016/0342977 | A1* | 11/2016 | Lam | G06Q 20/0658 |
| 2017/0243177 | A1 | 8/2017 | Johnsrud et al. | |
| 2017/0256003 | A1 | 9/2017 | Isaacson | |
| 2017/0345105 | A1 | 11/2017 | Isaacson | |
| 2018/0025442 | A1 | 1/2018 | Isaacson | |
| 2018/0089256 | A1* | 3/2018 | Wright, Sr. | G06Q 20/1235 |
| 2018/0189732 | A1* | 7/2018 | Kozloski | G06F 8/71 |
| 2018/0191503 | A1* | 7/2018 | Alwar | H04L 9/14 |
| 2018/0260212 | A1 | 9/2018 | Wisnovsky | |
| 2018/0293577 | A1* | 10/2018 | Kim | G06Q 20/36 |
| 2019/0007381 | A1 | 1/2019 | Isaacson | |
| 2019/0034922 | A1 | 1/2019 | Castinado | |
| 2019/0065709 | A1* | 2/2019 | Salomon | H04L 9/3263 |
| 2019/0095880 | A1 | 3/2019 | Glover | |
| 2019/0205873 | A1 | 7/2019 | Kamalsky | |
| 2019/0222422 | A1 | 7/2019 | Purves | |
| 2019/0230070 | A1* | 7/2019 | Isaacson | H04W 12/084 |
| 2019/0332691 | A1 | 10/2019 | Beadles | |
| 2019/0340013 | A1 | 11/2019 | Cella | |
| 2020/0005284 | A1 | 1/2020 | Vijayan | |
| 2020/0013048 | A1 | 1/2020 | Love | |
| 2020/0051068 | A1 | 2/2020 | Love | |
| 2020/0193431 | A1* | 6/2020 | Dao | G06Q 20/3829 |
| 2021/0117962 | A1* | 4/2021 | Ortiz | G06F 21/62 |

OTHER PUBLICATIONS

Office Action dated Jun. 23, 2021 in European Patent Application No. 19180155.4.

Antonopoulos, Andreas M., "Mastering Bitcoin—Unlocking Digital Cryoto-Currencies", O'Reilly, Dec. 1, 2014, pp. 1-282, XP055581333.

Takahisa Ishiguro et al., "Book that well illustrates the latest Blockchain", Aug. 1, 2017, pp. 132-138, with partial English translation.

* cited by examiner

FIG. 10

| URL | NEW VERSION NUMBER | BASE VERSION NUMBER | SOFTWARE DEVELOPER ID |
|---|---|---|---|
| https://server.com/aaa | 1.A1 | 1 | A |
| https://server.com/bbb | 1.A2 | 1.A1 | A |
| https://server.com/ddd | 1.B1 | 1 | B |
| https://server.com/eee | 1.B2 | 1.B1 | B |
| https://server.com/ccc | 1.A3 | 1.A2 | A |
| ... | ... | ... | ... |

| TOKEN PRICE | SENDER | DESTINATION |
|---|---|---|
| 50 | USER A | SOFTWARE DEVELOPER X |
| 25 | USER B | SOFTWARE DEVELOPER Y |
| 5 | USER C | SOFTWARE DEVELOPER Z |
| 75 | USER A | SOFTWARE DEVELOPER Y |

FIG. 26

| | VERSION NUMBER | SOFTWARE DEVELOPER |
|---|---|---|
| REQUESTED VERSION | 1.A3 | SOFTWARE DEVELOPER Z |
| FIRST-PREVIOUS VERSION OF REQUESTED VERSION | 1.A2 | SOFTWARE DEVELOPER Y |
| SECOND-PREVIOUS VERSION OF REQUESTED VERSION | 1.A1 | SOFTWARE DEVELOPER X |

| TOKEN PRICE | SENDER | DESTINATION | |
|---|---|---|---|
| 1000 | USER A | SOFTWARE DEVELOPER Z | 101 |
| 200 | SOFTWARE DEVELOPER Z | SOFTWARE DEVELOPER Y | 102 |
| 50 | SOFTWARE DEVELOPER Y | SOFTWARE DEVELOPER X | 103 |

MANAGEMENT METHOD, MANAGEMENT APPARATUS, AND PROGRAM

BACKGROUND

1. Technical Field

The present disclosure relates to management methods, management apparatuses, and programs.

2. Description of the Related Art

In management systems which manage software, the version information indicating versions of software developed by software developers is managed along with the identification information of the software developer (for example, see Japanese Unexamined Patent Application Publication No. 2014-203352).

SUMMARY

Unfortunately, traditional management systems do not ensure safe transactions of software between software developers and users.

An object of the present disclosure is to provide a management method for software versions in which the transaction safety of software is improved.

The management method according to one aspect of the present disclosure is A management method for software versions, the management method to be executed by a version management system, the management method including: receiving request information by a first management apparatus among management apparatuses which are included in the version management system and have distributed ledgers, the request information indicating a requested version requested by a user; and storing first transaction data in the distributed ledgers through execution of a consensus algorithm by the management apparatuses, the first transaction data indicating that the user provides a predetermined number of tokens to a software developer who has developed the requested version.

These comprehensive or specific aspects may be implemented with systems, methods, integrated circuits, computer programs, or recording media such as computer-readable CD-ROMs, or may be implemented with any combination of systems, methods, integrated circuits, computer programs, and recording media.

The present disclosure can provide a management method for software versions in which the transaction safety of software is improved.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 10 is a diagram illustrating an example of transaction data stored in a blockchain according to Embodiment 1;

FIG. 26 is a diagram illustrating one example of branch information according to Embodiment 3;

FIG. 27 is a diagram illustrating an example of transaction data for distributing the tokens according to Embodiment 3;

Figure 1:
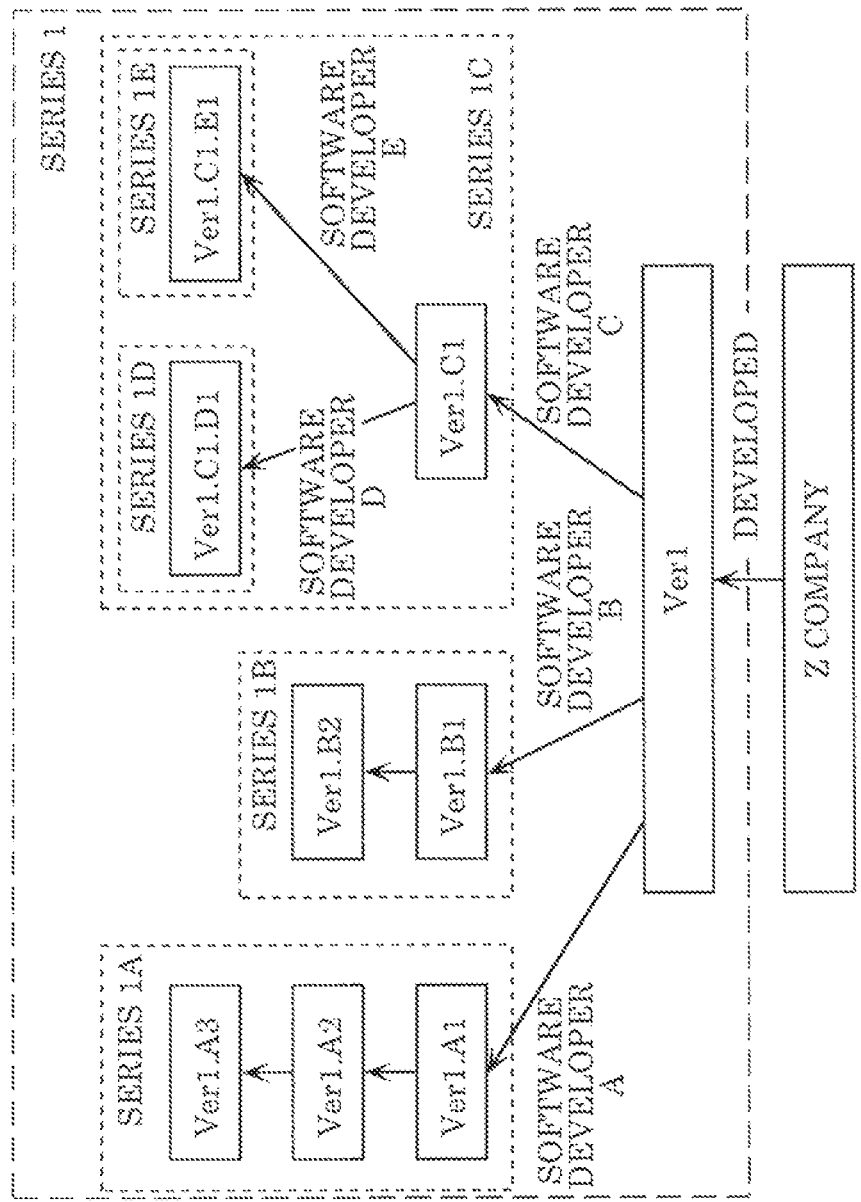
FIG. 1 is a diagram illustrating a version series of software in agile development.

DETAILED DESCRIPTION OF THE EMBODIMENTS (Underlying Knowledge Forming Basis of the Present Disclosure)

The present inventor has found that the following problem occurs in the development of software described in "BACKGROUND".

The software is developed by agile development in which not only software developing companies but also many unspecified software developers participate. Such a form of development may generate a variety of version series by improving the software by a large number of software developers.

In a management system which manages software, the version information indicating versions of software developed by the software developers are managed along with the identification information of the software developers (for example, see Japanese Unexamined Patent Application Publication No. 2014-203352).

Here, the version information has a role to uniquely specify the version of the software. The identification information of the software developer may be used to provide a reward the software developer about the development of a new version of the software.

Unfortunately, traditional management systems do not ensure safe transactions of software between the software developers and the users.

The present disclosure provides a management method in which the transaction safety of software is improved.

The management method according to one aspect of the present disclosure is A management method for software versions, the management method to be executed by a version management system, the management method including: receiving request information by a first management apparatus among management apparatuses which are included in the version management system and have distributed ledgers, the request information indicating a requested version requested by a user; and storing first transaction data in the distributed ledgers through execution of a consensus algorithm by the management apparatuses, the first transaction data indicating that the user provides a predetermined number of tokens to a software developer who has developed the requested version.

According to the aspect above, the distributed ledger manages provision of the tokens from the user to the software developer of the new version of the software. The distributed ledger is advantageous in obstructing the falsification of the possessed information and in reducing influences by system failures. For this reason, the management of the transmission and reception of the tokens by the distributed ledger prevents the falsification of the history of the transmission and reception of the tokens and the missing of the history. Thus, the management method for software versions can improve the transaction safety of software.

For example, the version management system may further possess identification information identifying software developers of one or more versions of the software. The management method may further include: transmitting second transaction data to the first management apparatus by a user apparatus used by the user, the second transaction data being data including the request information and further including identification information identifying the user as a sender of the predetermined number of tokens; obtaining, by the first management apparatus, identification information of a software developer of the requested version which is indicated by the request information included in the second transaction data; in the storing of the first transaction data in the distributed ledgers, generating the first transaction data which includes the identification information identifying the user as the sender included in the second transaction data as the sender of the predetermined number of tokens and includes the identification information, which has been obtained, as a destination of the predetermined number of tokens; and storing the first transaction data in the distributed ledgers by the management apparatuses.

According to the aspect above, the identification information of the software developer of the requested version received from the user apparatus using the second transaction data is obtained from a version management apparatus, and the identification information of the software developer is used as a destination of the tokens. Thereby, the distributed ledger manages provision of the tokens from the user to the software developer even when the user does not know the software developer of the requested version, that is, when the user apparatus does not possess the identification information of the software developer. Thus, the transaction safety of the software can be improved even when the user does not know the software developer of the requested version.

For example, the management method may further include: transmitting the first transaction data to the first management apparatus by a user apparatus, the first transaction data including identification information identifying the user as a sender of the predetermined number of tokens and identification information of the software developer of the requested version as a destination of the predetermined number of tokens; and in the storing of the first transaction data in the distributed ledgers, storing the first transaction data received from the user apparatus in the distributed ledgers.

According to the aspect above, the transaction data indicating that the tokens are provided from the user apparatus to the software developer of the requested version is transmitted from the user apparatus to the management apparatus (in other words, the token management apparatus). Thus, the distributed ledger manages the provision of the tokens from the user to the software developer even when the token management apparatus does not obtain the information on the software developer of the requested version from another apparatus. Accordingly, the transaction safety of the software can be improved even when the token management apparatus does not obtain the information on the software developer of the requested version from another apparatus.

For example, the version management system may further possess identification information identifying software developers of one or more versions of software, and the version management system may further include: obtaining first identification information which is the identification information of the software developer of the requested version indicated by the request information included in the first transaction data; and storing the first transaction data in the distributed ledgers only when the first identification information matches second identification information which is the identification information included in the first transaction data.

According to the aspect above, the identification information of the software developer of the requested version received from the user apparatus using the first transaction data is stored and managed in the distributed ledger only when this identification information matches the identification information of the software developer managed in the version management apparatus. Accordingly, if the identification information of the software developer possessed by the user apparatus is not correct (i.e., is an error, or is invalid), the tokens are not provided from the user to the software developer. This prevents the tokens from being provided to a false software developer. Thus, the transaction safety of the software can be improved by preventing the provision of the tokens to a dishonest software developer when the information possessed in the user apparatus is false.

For example, the version management system may further possess location information indicating locations where one or more versions of the software are stored. The management method may further include: providing the location information to the user apparatus used by the user after the management apparatuses store the first transaction data in the distributed ledgers, the location information indicating where the requested version of the software is stored; and obtaining, by the user apparatus, the requested version of the software using the location information provided.

According to the aspect above, after the provision of the tokens from the user to the software developer is managed by the distributed ledger, the software of the requested version is provided to the user. Thus, a transaction is performed more safely in which the software is provided in exchange for the tokens provided from the user apparatus. Accordingly, the transaction safety of the software can be further improved.

For example, in the storing of the first transaction data in the distributed ledgers, when the software developer who has developed the requested version includes two or more software developers of the requested version, first transaction data may be stored in the distributed ledgers, the first transaction data indicating that the predetermined number of tokens are provided from the user to the two or more software developers in a predetermined distribution ratio.

According to the aspect above, in the case where two or more software developers are responsible for the development of the requested version, the distribution and provision of the tokens from the user to the two or more software developers is managed by the distributed ledger. Accordingly, the transaction safety of the software can be improved even when two or more software developers are responsible for the development of the requested version.

For example, when the two or more software developers include one or more software developers of versions older than the requested version, the predetermined distribution ratio may be a distribution ratio in the software developer of the requested version and the one or more software developers, the distribution ratio being controlled such that a smaller number of tokens are distributed to a software developer of an older version.

According to the aspect above, when two or more software developers are responsible for the development of the requested version, tokens can be provided in the distribution ratio such that a smaller number of tokens are provided to a software developer of an older version, in other words, a larger number of tokens are provided to a software developer of a newer version. In general, it is considered that a software developer of a version closer to the requested version i.e., a newer version has greater contribution to the development of the requested version. The management method according to the present embodiment can implement such a distribution ratio of tokens according to the degree of contribution. Accordingly, the transaction safety of the software can be further improved through the distribution of the tokens according to the degree of contribution of two or more software developers responsible to the development of the requested version.

For example, processing according to the management method may be partially or entirely performed by executing smart contract codes stored in the distributed ledgers of the management apparatuses.

According to the aspect above, a series of processing such as the provision of the tokens from the user to the software developer is automatically executed based on the smart contract codes stored in the distributed ledger without intervention by any other person or system. Thus, the series of processing can be implemented with higher safety by the smart contract. Accordingly, the transaction safety of the software can be further improved.

For example, the version management system may further include a version management apparatus, and the version management apparatus may possess the identification information of the software developers of the one or more versions of the software.

According to the aspect above, the identification information of the software developers of the versions of the software is managed using the version management apparatus. Thus, the management method for software versions can further facilitate an improvement in transaction safety of the software using the version management apparatus.

For example, the version management apparatus may include version management apparatuses having distributed ledgers, and the distributed ledgers possessed by the version management apparatuses may store transaction data including the identification information of the software developers of the one or more versions of the software.

According to the aspect above, the version management apparatuses manage the software developers of the versions of the software according to the distributed ledgers, and the information of each software developer is used as a destination of the tokens. The distributed ledger is advantageous in obstructing the falsification of the possessed information and in reducing influences by system failures. Thus, the falsification of the information of the software developer of the version can be prevented, further improving the transaction safety of the software.

For example, the distributed ledgers may be blockchains, and the first transaction data indicating that the user provides the predetermined number of tokens to the software developer who has developed the requested version may be stored in the blockchains through execution of the consensus algorithm by the management apparatuses.

According to the aspect above, using the blockchains as the distributed ledgers, the management apparatuses can more readily prevent the falsification of the information under management.

The management apparatus according to one aspect of the present disclosure is a management apparatus which is one management apparatus among management apparatuses which are included in a version management system for managing software versions and have distributed ledgers, the management apparatus including: an obtainer which obtains request information indicating a requested version requested by a user; and a ledger manager which stores first transaction data in the distributed ledgers through execution of a consensus algorithm by the management apparatuses, the first transaction data indicating that predetermined number of tokens are provided from the user to a software developer who has developed the requested version.

Such a configuration achieves the same effect as that in the management method.

The program according to one aspect of the present disclosure is a program for operating a computer as one management apparatus among management apparatuses which are included in a version management system for managing software versions and have distributed ledgers, the program including: obtaining request information indicating a requested version requested by a user; and storing first transaction data in the distributed ledgers through execution of a consensus algorithm by the management apparatuses, the first transaction data indicating that predetermined number of tokens are provided from the user to a software developer who has developed the requested version.

Such a program achieves the same effect as that in the management method.

These comprehensive or specific aspects may be implemented with systems, methods, integrated circuits, computer programs, or recording media such as computer-readable CD-ROMs, or may be implemented with any combination of systems, methods, integrated circuits, computer programs, or recording media.

Embodiments will now be specifically described with reference to the drawings.

The embodiments described below all are comprehensively or specifically illustrative. Numeric values, shapes, materials, components, arrangements, positions, and connection forms thereof, steps, order of steps, and the like described in the following embodiments are exemplary, and should not be construed as limitative to the present disclosure. Among the components of the embodiments below, the components not described in an independent claim representing the most superordinate concept of the present disclosure are described as arbitrary components.

Embodiment 1

In the present embodiment, a management method for software versions will be described. Here, the software is, for example, software which is installed in a home appliance (such as a laundry machine, an air conditioner, a refrigerator, or a television set) to control the operation of the home appliance and demonstrate the function of the home appliance.

FIG. 1 is a diagram illustrating a version series of software in agile development.

As illustrated in FIG. 1, in the agile development, a software development company (Z Company) develops a first version, i.e., version 1 (represented as "Ver1" in the drawing, the same applies below), and provides Ver1 to the community of software developers. Based on the software of version 1 provided, the software developers belonging to the community then perform development to generate a variety of version series. Different software programs having different functions are developed in the version series, for example. The version series is represented as series 1A in FIG. 1. The version series includes one or more versions.

As illustrated in FIG. 1, based on the software of version 1, version 1.A1 is generated through the development by software developer A, version 1.B1 is generated through the development by software developer B, and version 1.C1 is generated through the development by software developer C.

Further development may be performed based on these versions. For example, version 1.A2 is developed based on version 1.A1, and version 1.A3 is developed based on version 1.A2. Version 1.B2 is developed based on version 1.B1. Based on version 1.C1, software developers D and E develop versions 1.C1.D1 and 1.C1.E1 as version series.

Here, the versions of and after version 1.A1 (i.e., version 1.A1 and versions 1.A2 and 1.A3 which are versions developed based on version 1.A1) are referred to as series 1A. Similarly, the versions of and after version 1.B1 are referred to as series 1B. Version 1.C1 is referred to as series 1C, version 1.C1.D1 is referred to as series 1D, and version 1.C1.E1 is referred to as series 1E. The series including version 1 and all the versions of series 1A to 1E is referred to as series 1 in some cases.

As described above, in the agile development, software developers different from the software development company develop software based on the software provided by the software development company (Z Company), generating several version series.

Among these versions, a version which a user desires is provided to the user. For example, the latest version of the version series having the functions which the user desires is provided to the user.

Figure 2:
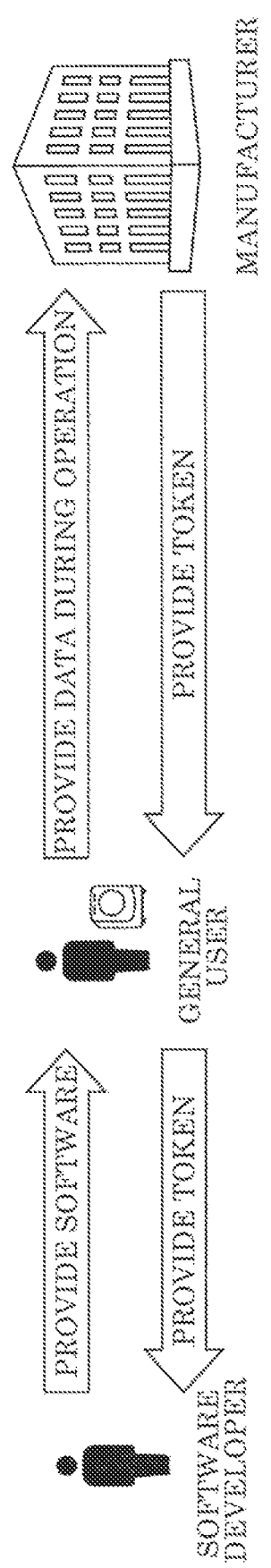
FIG. 2 is a diagram illustrating transmission and reception of a token in the agile development.

FIG. 2 is a diagram illustrating transmission and reception of a token in the agile development. Here, the token represents a concept corresponding to a profit or value, and may be possessed and transferred by a person (natural person) or a manufacturer (legal person). In the agile development, the development of the software is advanced by appropriately transferring tokens between a software developer, a general user, and a manufacturer.

For example, the general user receives the software provided by the software developer. The user operates the home appliance by operating the software on the home appliance possessed by the user. The general user provides tokens to the software developer in exchange for the software provided.

The general user provides the data of the product, which is obtained when the home appliance having the software installed therein, is operated, to the manufacturer, and receives tokens in exchange for the data.

Here, the tokens are directly transferred between the general user and the software developer without the manufacturer interposed therebetween. When such transfer of the tokens occurs, the identification information of the software developer under management may be falsified for the purpose of dishonestly obtaining a profit or impairing profits of others in some cases. The falsified identification information enables the following behaviors: A malicious person may spoof the software developer to receive the tokens, or may spoof another person to provide malicious software and damage the reputation of the software developer.

The management system according to the present embodiment aims at preventing the falsification of information under management.

Figure 3:
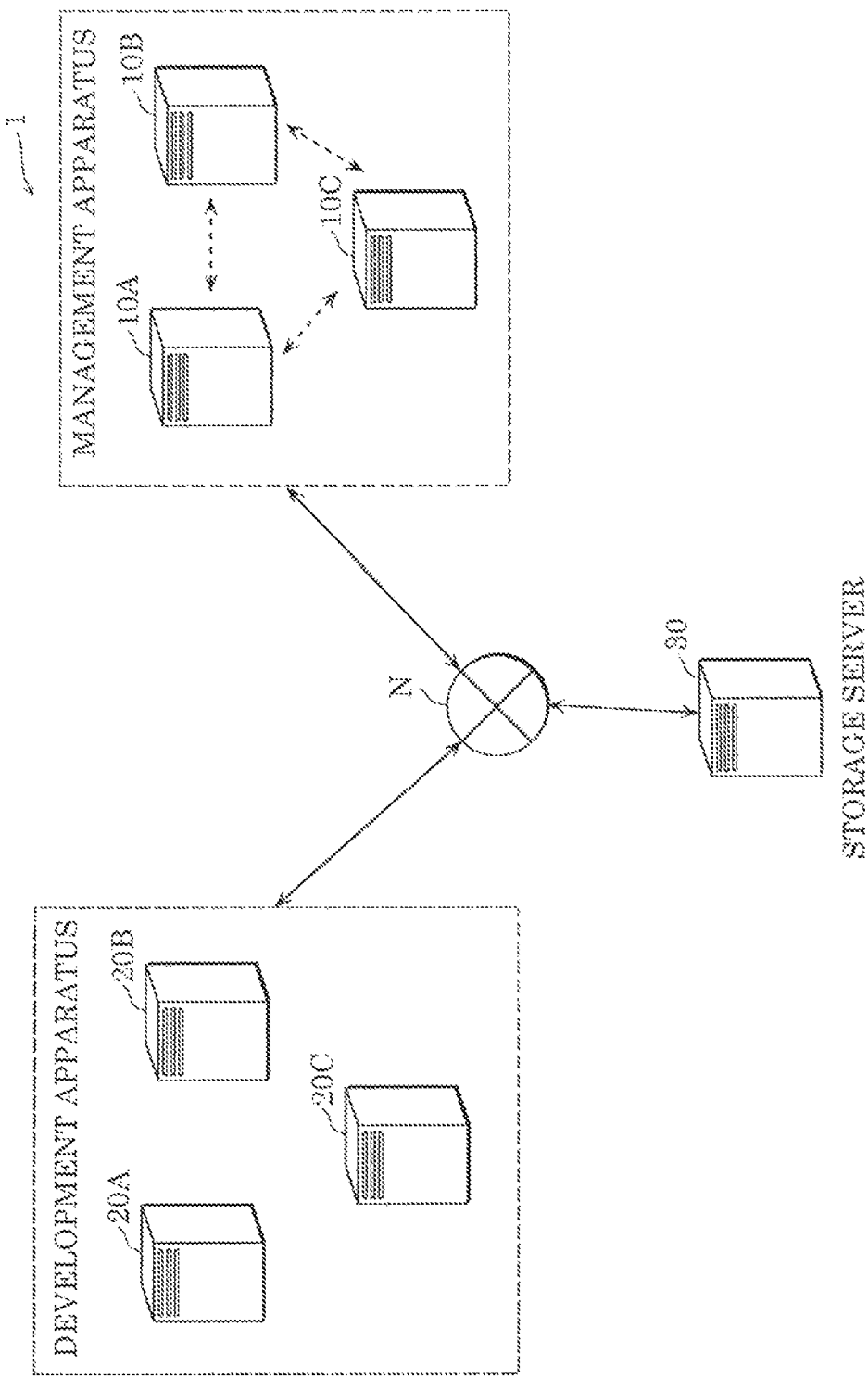
FIG. 3 is a diagram illustrating a configuration of a management system according to Embodiment 1.

FIG. 3 is a diagram illustrating a configuration of management system 1 according to Embodiment 1.

As illustrated in FIG. 3, management system 1 includes management apparatuses 10A, 10B, and 10C, development apparatuses 20A, 20B, and 20C, and storage server 30. These apparatuses are communicably connected to each other through network N.

Management apparatuses 10A, 10B, and 10C (also referred to as management apparatuses 10A and others) are management apparatuses which manage the information on the versions of software by computers. Although an example of three management apparatuses 10A and others will be described, the number of management apparatuses may be two or more. Management apparatuses 10A and others are communicably connected to each other. Although management apparatus 10A is used as a representative of management apparatuses 10A and others in the following description in some cases, the same also applies to other management apparatuses 10B and 10C. Management apparatuses 10A and others can also communicate through network N.

Management apparatuses 10A and others each have a distributed ledger for managing the information on the version of software. Management apparatuses 10A and others update the distributed ledgers of their own while synchronizing with each other through communication. When one of management apparatuses 10A and others obtains the information on a new version from one of development apparatuses 20A and others, management apparatuses 10A and others each have a copy of the obtained information. In general, the distributed ledger is advantageous in obstructing the falsification of the possessed information and in reducing influences by the system failure.

Development apparatuses 20A, 20B, and 20C (also referred to as development apparatuses 20A and others) are computers used by a software developer of the software, and each independently operate. Although an example of three development apparatuses 20A and others will be described, the number of development apparatuses may be one or more. Although development apparatus 20A is used as a representative of development apparatuses 20A and others in the following description, the same also applies to other development apparatus 20B and 20C.

The software developer develops a new version of the software using development apparatus 20A, and transmits the developed software of the new version to storage server 30 to store the software in storage server 30. Development apparatus 20A also transmits the information on the new version developed by the software developer through network N to one of management apparatuses 10A and others.

Storage server 30 is a computer which stores the software. Storage server 30 stores one or more versions of the software in a memory device.

Network N is a communication line which communicably connects management apparatuses 10A and others, development apparatus 20A, and storage server 30 to each other. Any communication line can be used. Any combination of wired networks with wireless networks may be used. Network N may partially include the Internet.

Storage server 30, development apparatuses 20A and others, and management apparatuses 10A and others will now be described in more detail.

Figure 4:
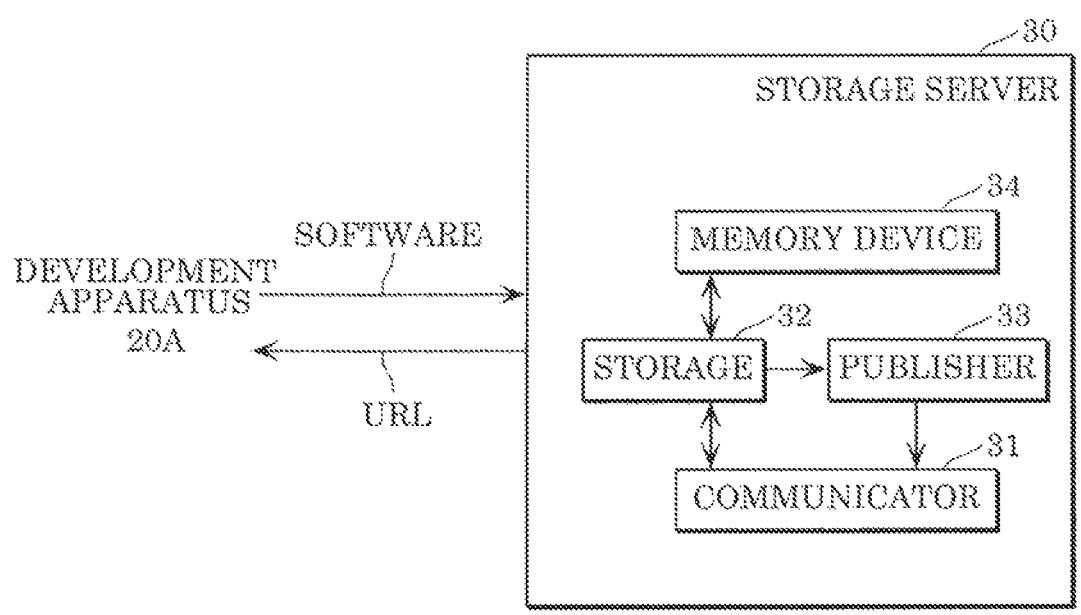
FIG. 4 is a block diagram illustrating a configuration of a storage server according to Embodiment 1.

FIG. 4 is a block diagram of a configuration of storage server 30 according to the present embodiment.

As illustrated in FIG. 4, storage server 30 includes communicator 31, storage 32, publisher 33, and memory device 34. The functions of storage server 30 can be implemented by a processor which executes a predetermined program using a memory.

Communicator 31 is a communication interface device connected to network N. Storage server 30 can communicate with development apparatus 20A through communicator 31.

Storage 32 is a processor which stores the software using memory device 34. Storage 32 obtains the software of the new version from development apparatus 20A through communicator 31, and stores the obtained software in memory device 34. Storage 32 also reads the software stored in memory device 34 in response to a request from a user.

Publisher 33 is a processor which publishes location information indicating the location where the software is stored. In the case where storage 32 stores the software in memory device 34, publisher 33 obtains the information indicating the location where the software is stored, and generates and publishes the location information indicating the location. Publisher 33 notifies development apparatus 20A of the generated location information.

The location information is, for example, a uniform resource locator (URL) indicating a position on the Internet of an electric file related with the software in memory device 34. This case will now be described below as an example. The URL includes the information of the path indicating the location in memory device 34 and the file name, and the host name of storage server 30, for example.

Memory device 34 is a memory device in which the software is stored. Memory device 34 stores one or more versions of the software. The software is stored in memory device 34 by storage 32, and is read therefrom by storage 32.

Figure 5:
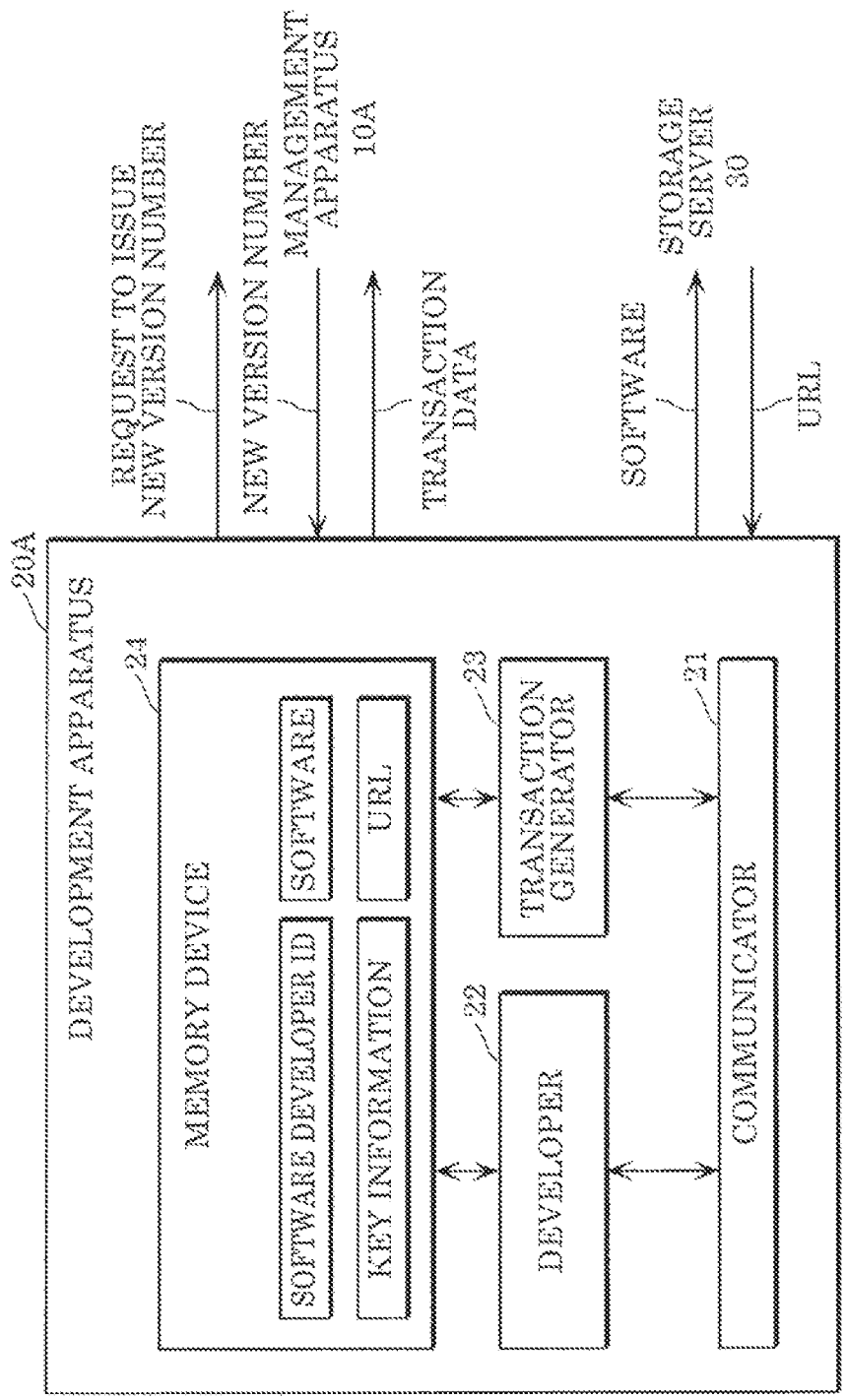
FIG. 5 is a block diagram illustrating a configuration of a development apparatus according to Embodiment 1.

FIG. 5 is a block diagram illustrating a configuration of development apparatus 20A according to the present embodiment. Development apparatuses 20B and 20C also have the same configuration, and each independently operate.

As illustrated in FIG. 5, development apparatus 20A includes communicator 21, developer 22, transaction generator 23, and memory device 24. The functions of development apparatus 20A can be implemented by a processor which executes a predetermined program using a memory.

Communicator 21 is a communication interface device connected to network N. Development apparatus 20A can communicate with storage server 30 and management apparatus 10A through communicator 21.

Developer 22 is a processor which generates a new version of the software developed by the software developer based on the operation by a user or the function of a tool for developing software. Developer 22 specifically has software (or program or program codes) of a version (corresponding to a first version) underlying the development of the software, and generates a new version (corresponding to second version) of the software based on the possessed software. Thus, the software developer develops the new version of the software using development apparatus 20A (specifically, developer 22). The development of the new version is also referred to as version upgrade. Developer 22 transmits the developed software of the new version through communicator 21 to storage server 30 to store the software in storage server. At this time, storage server 30 (specifically, publisher 33) notifies developer 22 of the URL indicating the location of the software stored in storage server 30.

Transaction generator 23 is a processor which generates transaction data including the information on the version of the software. The transaction data includes at least information on a first version of the software (corresponding to first information), information on a second version obtained through version upgrade of the first version by the software developer (corresponding to second information), a software developer ID as an identification information of the software developer, and the electronic signature of the software developer. The electronic signature of the software developer is generated from the information included in the transaction data through encryption with the private key of the software developer. The identification information of the software developer and the private key thereof can be obtained by reading these from memory device 24 by transaction generator 23. Transaction generator 23 transmits the generated transaction data through communicator 21 to management apparatus 10A.

Transaction generator 23 also generates a request to issue a new version number, and transmits the request to management apparatus 10A. Transaction generator 23 receives the notification of the new version number in reply.

Memory device 24 is a memory device which stores the information on the software developer and the information on the software. The information on the software developer includes a software developer ID as the identification information of the software developer, and key information of the software developer (including the private key). The software developer ID is information which enables unique identification of the software developer. The information on the software includes a body of software, and the URL indicating the location in storage server 30 where the software is stored. Here, the body of software indicates a software program, and is simply represented as "software" in FIG. 5.

The body of software stored in memory device 24 is read by developer 22. The software developer ID, the key information, and the URL stored in memory device 24 are read by transaction generator 23.

Figure 6:
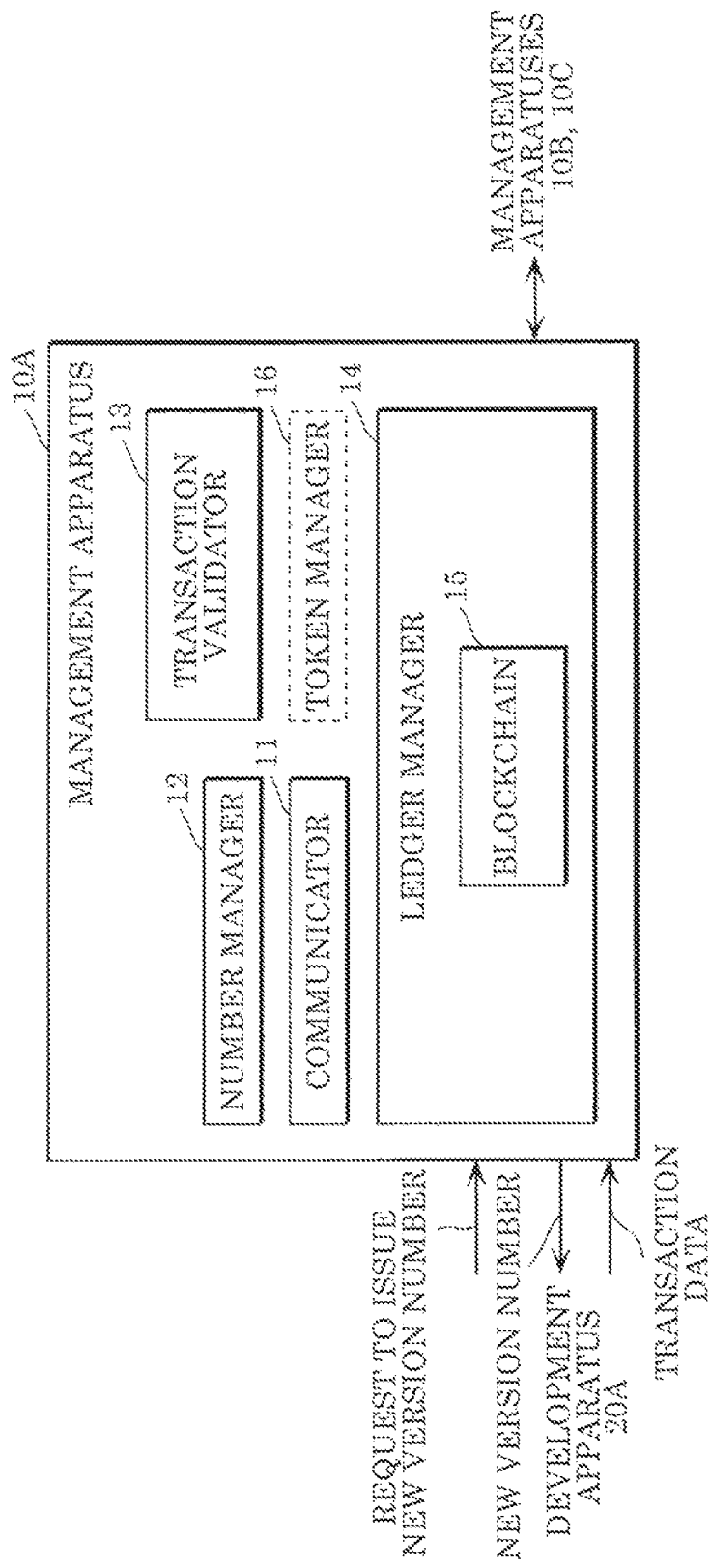
FIG. 6 is a block diagram illustrating a configuration of a management apparatus according to Embodiment 1.

FIG. 6 is a block diagram illustrating a configuration of management apparatus 10A according to the present embodiment.

As illustrated in FIG. 6, management apparatus 10A includes communicator 11, number manager 12, transaction validator 13, ledger manager 14, and token manager 16. The functions included in management apparatus 10A can be implemented by a processor which executes a predetermined program using a memory.

Communicator 11 is a communication interface device connected to network N. Management apparatus 10A can communicate with development apparatus 20A and other management apparatuses 10B and 10C through communicator 11.

Number manager 12 is a processor which manages the version number of the version of the software. When receiving a request to issue a new version number of the software from development apparatus 20A, number manager 12 issues the new version number according to the request, and notifies development apparatus 20A of the request. Among the versions currently possessed, number manager 12 issues a version number advanced from the version number of the latest version. In the case where the version has several series, number manager 12 receives a request to issue a new version number for each series, and issues a version number for each series.

Here, the version number is set according to predetermined rules. For example, the version number is set using numeric values such that a more advanced version (that is, a version more repeatedly subjected to version upgrade) has a greater numeric value. At this time, letters may also be used in combination with numeric values. Here, an example where the version series is represented with letters will be illustrated. In other words, the versions included in series 1A developed based on the first version, i.e., version 1 are referred to as version 1.A1, version 1.A2, version 1.A3, and the like. The versions included in series 1B developed based on version 1 separately from series 1A are referred to as version 1.B1, version 1.B2, and the like.

Transaction validator 13 is a processor which validates the legitimacy of the transaction data. Transaction validator 13 receives the transaction data through communicator 11 from development apparatus 20A. The transaction data to be received includes first information on the first version of the software, second information on the second version of the software obtained through version upgrade of the first version by the software developer, the identification information of the software developer, and the electronic signature of the software developer. When receiving the transaction data, transaction validator 13 validates the legitimacy of the transaction data using the electronic signature included in the received transaction data. The legitimacy of the transaction data is validated using the information included in the transaction data and the public key of the software developer to determine the legitimacy of the transaction data. More specifically, it is determined that the transaction data is surely generated by development apparatus 20A and the transaction data has not been falsified from the generation. The validation of the legitimacy of the transaction data is also simply referred to as validation of the transaction data.

The transaction data received by transaction validator 13 may include a new version number notified by number manager 12.

The transaction data received by transaction validator 13 may further include the URL or location information of the software of the new version.

Ledger manager 14 is a processor which manages the distributed ledger for managing the versions of software. Although an example where the distributed ledger is blockchain 15 will be described here, another type distributed ledger (such as IOTA or a hashgraph) may also be used.

In the case where transaction validator 13 validates the transaction data, ledger manager 14 synchronizes the transaction data through the transmission of the transaction data to other management apparatuses 10B and 10C. Ledger manager 14 then executes a consensus algorithm between management apparatus 10A and other management apparatuses 10B and 10C. In the case where an agreement is generated by the consensus algorithm, a block including the transaction data is generated, and the generated block is stored in blockchain 15.

Although one example of consensus algorithms is Practical *Byzantine* Fault Tolerance (PBFT), any other consensus algorithms such as Proof of Work (PoW) or Proof of Stake (PoS) may also be used.

Token manager 16 is a processor which manages tokens possessed by the user and the software developer. Token manager 16 provides a token to the software developer with reference to the transaction data stored in blockchain 15. Token manager 16 may use blockchains for management of tokens.

Three examples of a configuration of transaction data which allows management apparatuses 10A and others to manage the new version of the software will now be illustrated.

Figure 7:
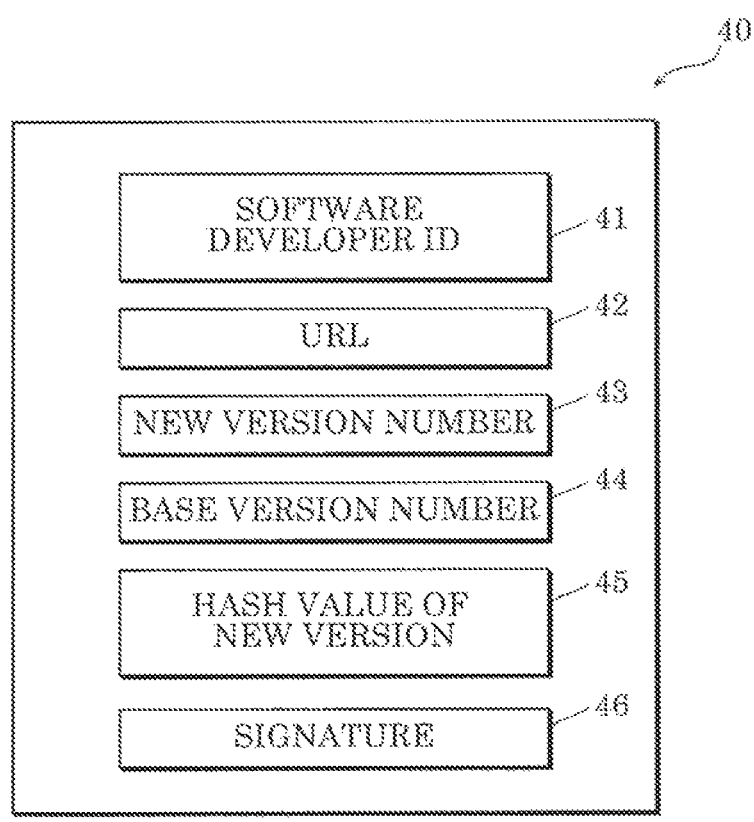
FIG. 7 is a diagram illustrating a first example of transaction data according to Embodiment 1.

FIG. 7 is a diagram illustrating transaction data 40 as a first example of the transaction data according to the present embodiment. Transaction data 40 is an example where the first information on the first version of the software includes the hash value of the first version of the software and the version number of the first version, and the second information on the second version of the software includes the version number of the second version.

As illustrated in FIG. 7, transaction data 40 includes software developer ID 41, URL 42, new version number 43, base version number 44, hash value 45 of the new version, and signature 46.

Software developer ID 41 is the identification information of the software developer who has developed the new version to be newly managed according to transaction data 40.

URL 42 is an URL indicating the location where the new version to be newly managed according to transaction data 40 is stored. URL 42 indicates the location in memory device 34 of storage server 30 where the software of the new version is stored.

New version number 43 is a version number of the new version to be newly managed according to transaction data 40.

Base version number 44 is a version number of the version (also referred to as base version) underlying the new version to be newly managed according to transaction data 40.

Hash value 45 of the new version is a hash value obtained through a hash operation performed on all the programs of the new version to be newly managed according to transaction data 40 or predetermined part of the programs.

Signature 46 is an electronic signature generated from the information included in transaction data 40 through encryption with the private key of the software developer. Specifically, signature 46 is a value obtained as follows: A hash value is obtained by performing a hash operation on the information including software developer ID 41, URL 42, new version number 43, base version number 44, and hash value 45 of the new version, and is encrypted with the private key of the software developer.

Figure 8:
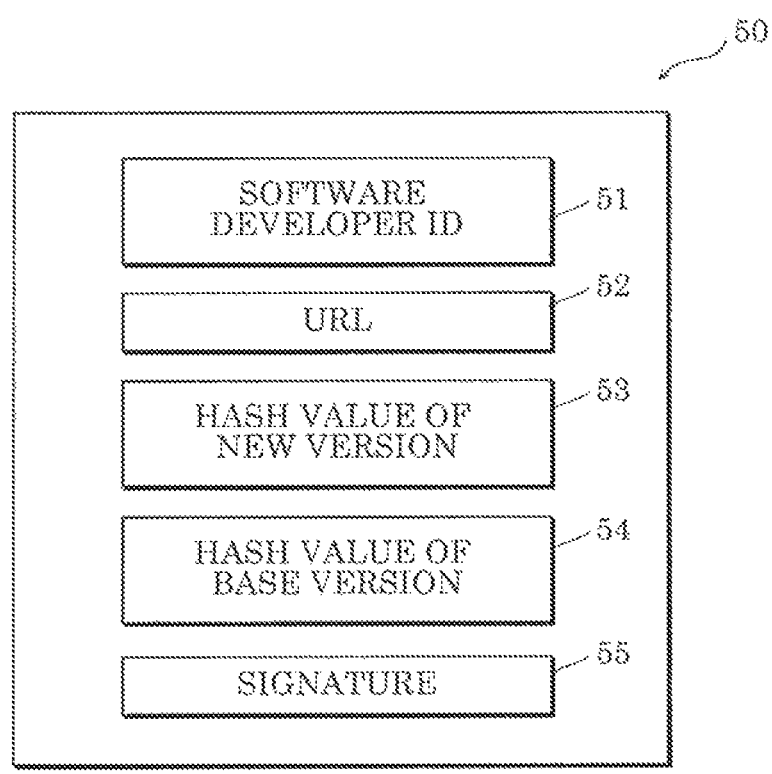
FIG. 8 is a diagram illustrating a second example of transaction data according to Embodiment 1.

FIG. 8 is a diagram illustrating transaction data 50 as a second example of the transaction data according to the present embodiment. Transaction data 50 is an example where the first information on the first version of software includes the hash value of the first version of the software and the second information on the second version of the software includes the hash value of the second version of the software.

As illustrated in FIG. 8, transaction data 50 includes software developer ID 51, URL 52, hash value 53 of the new version, hash value 54 of the base version, and signature 55.

Software developer ID 51 and URL 52 are the same as those in transaction data 40.

Hash value 53 of the new version is a hash value obtained by the hash operation performed on all the programs of the new version of the software to be newly managed according to transaction data 50 or predetermined part of the programs.

Hash value 54 of the base version is a hash value obtained by the hash operation performed on all the programs of the base version of the software underlying the new version of the software to be newly managed according to transaction data 50 or predetermined part of the programs.

Signature 55 is an electronic signature generated from the information included in transaction data 50 through encryption with the private key of the software developer. Specifically, signature 55 is a value obtained as follows: A hash value is obtained by performing a hash operation on the information including software developer ID 51, URL 52, hash value 53 of the new version, and hash value 54 of the base version, and is encrypted with the private key of the software developer.

Figure 9:
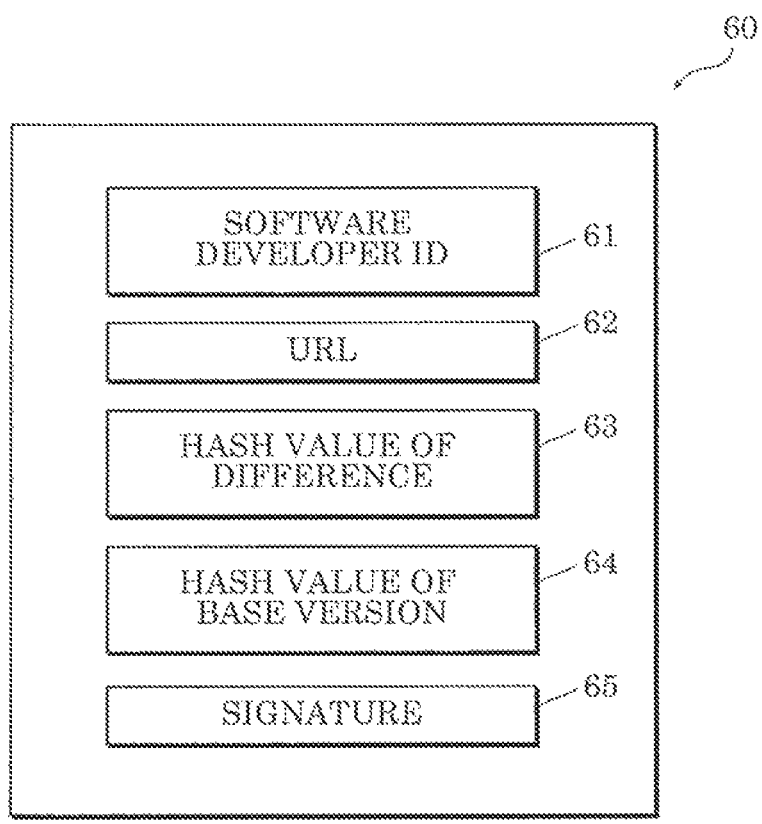
FIG. 9 is a diagram illustrating a third example of transaction data according to Embodiment 1.

FIG. 9 is a diagram illustrating transaction data 60 as a third example of the transaction data according to the present embodiment. Transaction data 60 is an example where the first information on the first version of software includes the hash value of the first version of the software, and the second information on the second version of the software includes the hash value of the difference between the first version of the software and the second version thereof.

As illustrated in FIG. 9, transaction data 60 includes software developer ID 61, URL 62, hash value 63 of the difference, hash value 64 of the base version, and signature 65.

Software developer ID 61 and URL 62 are the same as those in transaction data 40.

Hash value 63 of the difference is a hash value of the difference between a new version of the program to be newly managed according to transaction data 60 and a base version of the program underlying the development of the new version.

Hash value 64 of the base version is a hash value obtained through a hash operation performed on all the programs in the new version of the software to be newly managed according to transaction data 60 or predetermined part of the programs.

Signature 65 is an electronic signature generated from the information included in transaction data 60 through encryption with the private key of the software developer. Specifically, signature 65 is a value obtained as follows: A hash value is obtained by performing a hash operation on the information including software developer ID 61, URL 62, hash value 63 of the difference, and hash value 64 of the base version, and is encrypted with the private key of the software developer.

The transaction data stored in blockchain 15 will now be described.

FIG. 10 is a diagram illustrating an example of the transaction data stored in blockchain 15 according to the present embodiment. FIG. 10 is specifically transaction data managed with blockchain 15 by management apparatuses 10A and others. One entry (one row) shown in FIG. 10 corresponds to one piece of transaction data. The data located in a lower portion of FIG. 10 is newer transaction data.

As illustrated in FIG. 10, each transaction data includes the URL, the new version number, the base version number, and the software developer ID of each version of the software. The information in the transaction data illustrated in FIG. 10 corresponds to the information included in transaction data 40 illustrated in FIG. 7.

As illustrated in FIG. 10, blockchain 15 stores the information on the early versions of the software from the current point of time. Specifically, blockchain 15 stores the information indicating that versions 1.A1, 1.A2, and 1.A3 are developed from version 1 and that versions 1.B1 and 1.B2 are developed from version 1.

The information on the early versions of the software from the current point of time is managed by management apparatus 10A so as to prevent falsification, because the blockchain is difficult to falsify.

Processing of management system 1 will now be described.

Figure 11:
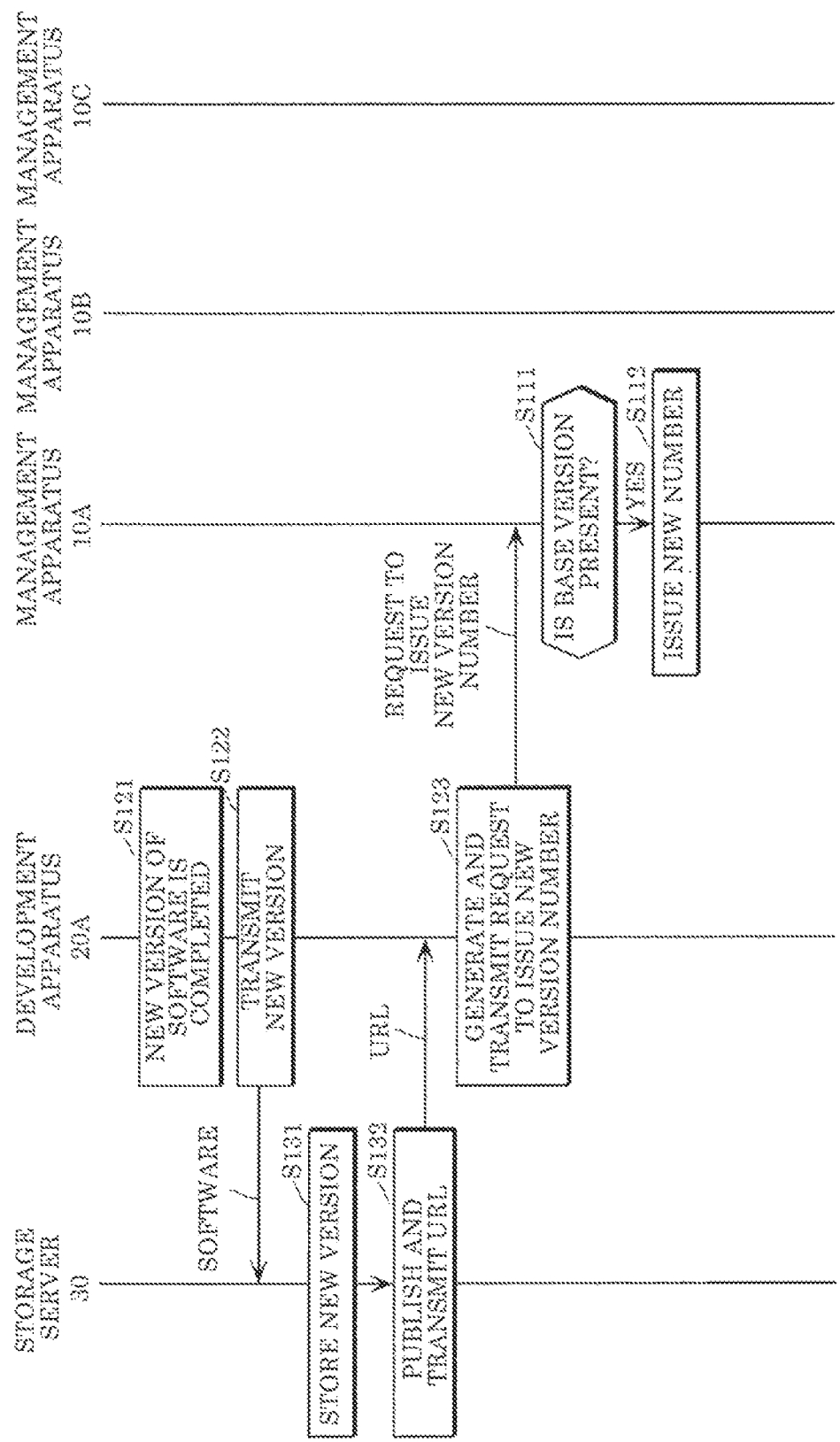
FIG. 11 is a sequence diagram illustrating first processing in the management system according to Embodiment 1.
Figure 12:
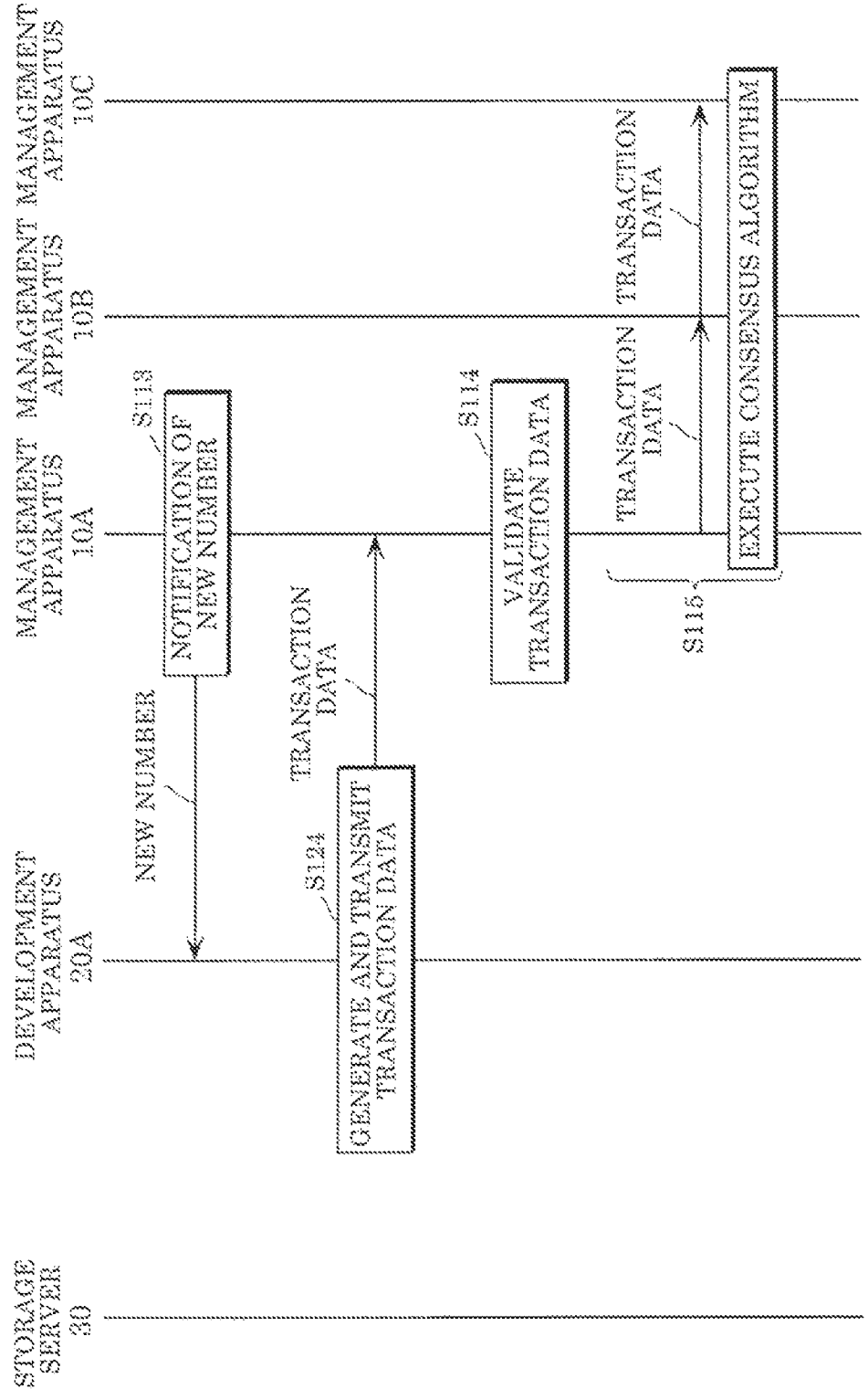
FIG. 12 is a sequence diagram illustrating second processing in the management system according to Embodiment 1.

FIGS. 11 and 12 are sequence diagrams illustrating first and second processings in management system 1 according to the present embodiment, respectively. FIGS. 11 and 12 illustrate a series of processing from the development of the new version of the software by development apparatus 20A to the management of the developed version of the software by management apparatuses 10A and others.

As illustrated in FIG. 11, in step S121, a new version of the software is completed by development apparatus 20A.

In step S122, development apparatus 20A transmits the new version of the software developed in step S121 to storage server 30 to store the new version of the software in storage server 30.

In step S131, storage server 30 receives the new version of the software transmitted from development apparatus 20A, and stores it in memory device 34.

In step S132, storage server 30 publishes an URL indicating the location of the new version of the software stored in step S131. Storage server 30 then transmits the published URL to development apparatus 20A. The URL can be transmitted as a reply to the software received in step S122.

In step S123, development apparatus 20A generates a request to issue a new version number (also referred to as new number), and transmits it to management apparatus 10A. Here, the request to issue a new version number is communication data for requesting the issuing of a new number to be assigned to the new version of the software (i.e., the new version number) to management apparatus 10A. The request includes at least the base version number.

In step S111, management apparatus 10A receives the request transmitted in step S123, and determines whether the base version included in the request is stored in blockchain 15 managed by management apparatus 10A. In the case where management apparatus 10A determines that the base version is stored in blockchain 15 (Yes in step S111), the processing goes to step S112.

In the case where management apparatus 10A determines that the base version is not stored in blockchain 15 (not illustrated), management apparatus 10A executes predetermined error processing (such as processing to transmit a notification indicating the failure of the issuing of the new number to development apparatus 20A), and terminates the processing. In this case, management apparatus 10A may terminate the processing without performing any processing. Management apparatus 10A determines that the base version is not stored in blockchain 15, for example, when management apparatuses 10A and others are caused to manage a version of software not managed by management apparatuses 10A and others.

In step S112, management apparatus 10A issues the version number of the new version.

Referring to FIG. 12, in step S113, management apparatus 10A notifies development apparatus 20A of the version number of the new version issued in step S112. The notification of the version number of the new version can be transmitted as a reply to the request to issue the new version number in step S123.

In step S124, transaction data for writing the new version in blockchain 15 is generated, and is transmitted to management apparatus 10A. This transaction data includes the new version number transmitted in step S113 or the information calculated using this new version number.

In step S114, management apparatus 10A validates the transaction data transmitted by development apparatus 20A in step S124. Here, assume that it is determined as a result of validation of the transaction data that the transaction data is legitimate.

In step S115, management apparatus 10A transmits the transaction data to management apparatuses 10B and 10C. The block including the transaction data is stored in blockchain 15 through execution of the consensus algorithm by management apparatuses 10A and others. Thus, the information on the new version of the software developed by the software developer, more specifically, the software developer ID and the version number are stored in blockchain 15, obstructing the falsification of the information after the storage thereof.

In the case where the validation of the transaction data is failed in step S114, that is, it is validated that the transaction data is not legitimate, development apparatus 20A may be notified of this failure. By this notification, the software developer can recognize and treat the failure. This notification does not need to be performed.

Management apparatus 10A may store the software itself in blockchain 15, and manage the software. Such an operation is more useful because not only the information on the version but also the software can be managed while the falsification of the software itself is also prevented. To do so, development apparatus 20A may generate the transaction data including the software itself (i.e., the program codes of the software), and transmit the transaction data to management apparatus 10A. Management apparatus 10A may store the received transaction data in blockchain 15.

As above, in the management method according to the present embodiment, the information on the software developer who has updated the version of the software is managed by the distributed ledger. The distributed ledger is advantageous in obstructing the falsification of the possessed information and in reducing influences by system failures. Accordingly, the management method can prevent the falsification of the information under management.

Moreover, the version number of the new version is issued, and the information on the software developer of the new version is managed in correspondence with the issued version number. Failures such as duplication of the version number may occur when the version number is assigned by an apparatus different from the version management system. The management method according to the present disclosure can prevent such failures of the version number and prevent the falsification of the information under management.

The prevention in falsification of the information under management can be further facilitated using the hash value of the first version, the version number of the first version, and the version number of the second version.

The prevention in falsification of the information under management can be further facilitated using the hash value of the first version and the hash value of the second version.

The prevention in falsification of the information under management can be further facilitated using the hash value of the first version and the hash value of the difference between the first version and the second version.

Moreover, the information indicating the location where the software of the second version is stored is stored in the distributed ledger together with the information on the software developer. Accordingly, further, the falsification of the information under management can be prevented while the falsification of the information on the location where the second version is stored is also prevented.

Moreover, the tokens are provided to the software developer of the new version based on the transaction data so far. Because the falsification of the transaction data stored in the distributed ledger is difficult, provision of the tokens to an inappropriate person who spoofs the software developer can be prevented. Thus, the falsification of the information under management can be prevented, preventing inappropriate provision of the tokens.

Embodiment 2

In the present embodiment, a management method for software versions which provides improved transaction safety of the software will be described. Here, a management method of improving the transaction safety when the software managed by the management method for versions according to Embodiment 1 is provided to a user will be described.

Figure 13:
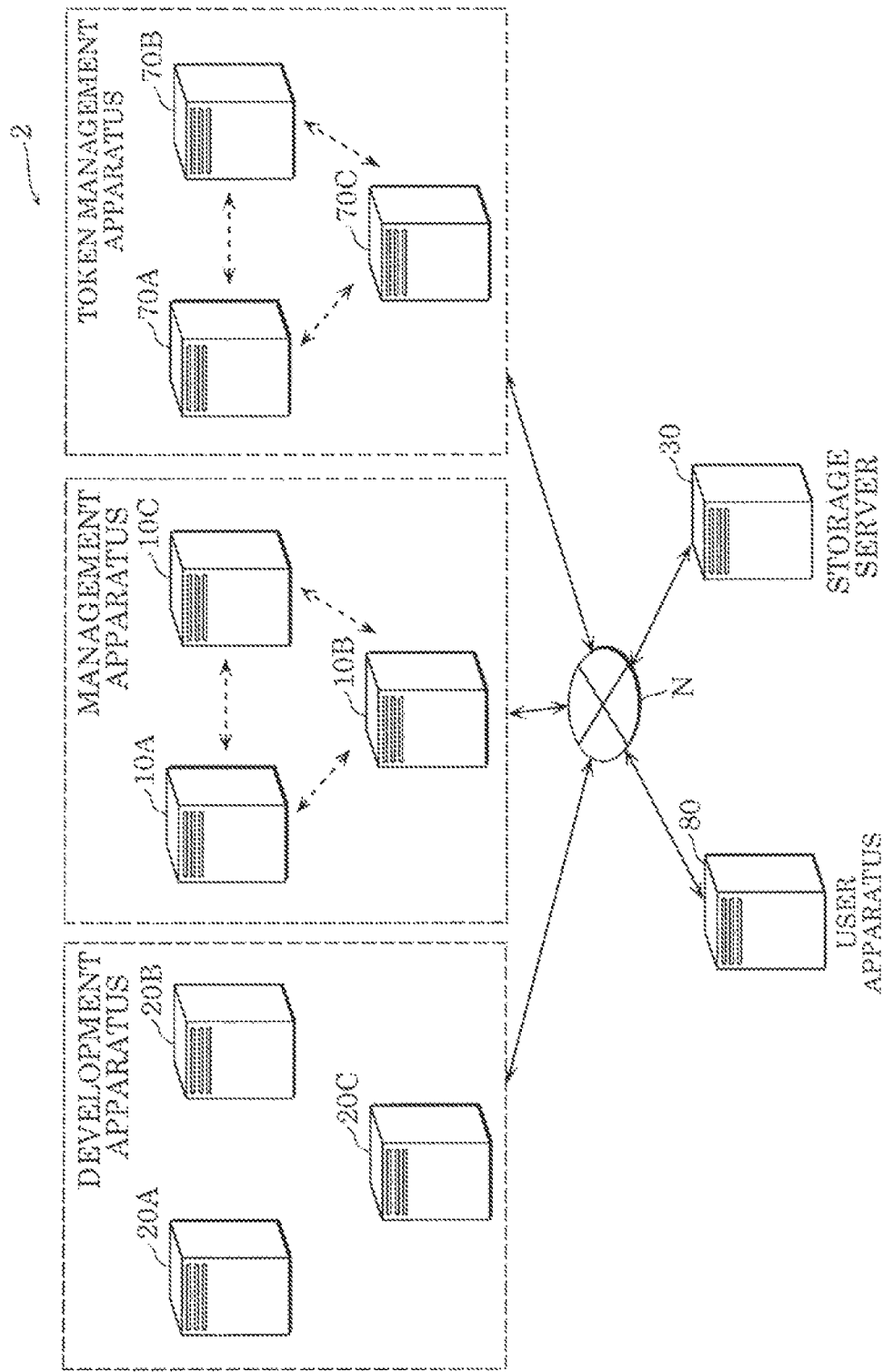
FIG. 13 is a diagram illustrating a configuration of a management system according to Embodiment 2.

FIG. 13 is a diagram illustrating a configuration of management system 2 according to the present embodiment.

As illustrated in FIG. 13, management system 2 according to the present embodiment includes management apparatuses 10A and others, development apparatuses 20A and others, storage server 30, token management apparatuses 70A, 70B, and 70C (also referred to as 70A and others), and user apparatus 80. Management apparatuses 10A and others according to the present embodiment are also referred to as version management apparatuses. Token management apparatuses 70A and others are also simply referred to as management apparatuses. The token management apparatus may also be configured to additionally have the function of the version management apparatus.

Management apparatuses 10A and others, development apparatuses 20A and others, and storage server 30 are the same as those in Embodiment 1, and their descriptions will be omitted.

Token management apparatuses 70A and others are management apparatuses which manage transmission and reception of tokens between software developers and a user by computers. Although an example of three token management apparatuses 70A and others will be described, the number thereof may be any number of two or more. Token management apparatuses 70A and others are communicably connected to each other. Although token management apparatus 70A is used as a representative of token management apparatuses 70A and others in the following description in some cases, the same also applies to other token management apparatuses 70B and 70C. Token management apparatuses 70A and others can also communicate through network N.

Token management apparatuses 70A and others each possess a distributed ledger for managing the information on the transmission and reception of tokens. Token management apparatuses 70A and others update the possessed distributed ledgers while synchronizing with each other through communication. When one of token management apparatuses 70A and others obtains the information on the transmission and reception of tokens from user apparatus 80, token management apparatuses 70A and others each possess a copy of the obtained information. In general, the distributed ledger is advantageous in obstructing the falsification of the possessed information and in reducing influences by the system failure.

User apparatus 80 is used by a user of the software. User apparatus 80 is associated with the user. User apparatus 80 has a communication function accessible to network N. While an example where user apparatus 80 is an information terminal such as a computer, a smartphone, or a tablet will be described, user apparatus 80 may be a home appliance provided with a communication interface accessible to network N.

The software stored in storage server 30 is provided to user apparatus 80 in response to an operation of the user. The software provided to user apparatus 80 is provided to a home appliance, and the home appliance then operates using the software. In the case where user apparatus 80 is a home appliance, user apparatus 80 operates using the software provided after the software is provided.

When the software is provided, user apparatus 80 transmits transaction data for providing a token to the software developer to token management apparatus 70A. The tokens are provided to the software developer in exchange for the software provided, for example.

User apparatus 80 and token management apparatuses 70A and others will now be described in more detail.

Figure 14:
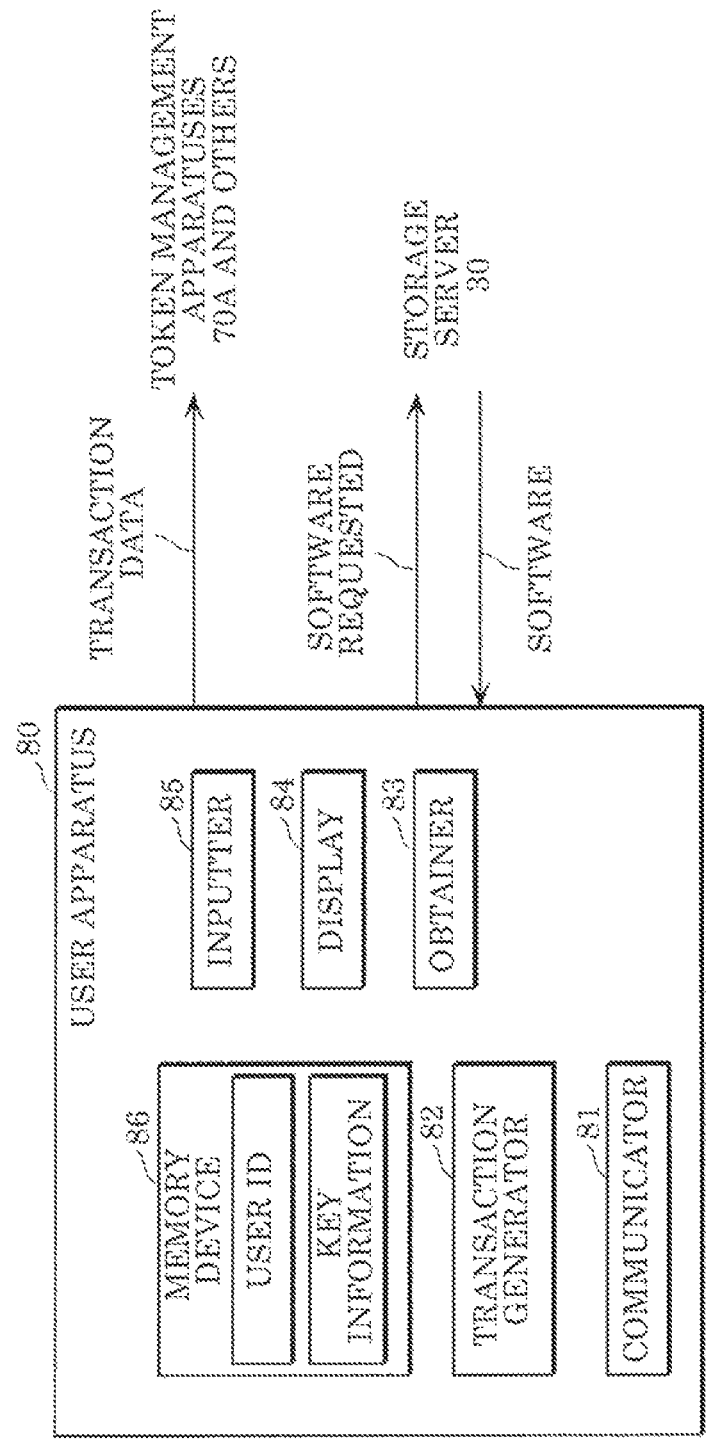
FIG. 14 is a diagram illustrating a configuration of a user apparatus according to Embodiment 2.

FIG. 14 is a diagram illustrating a configuration of user apparatus 80 according to the present embodiment.

As illustrated in FIG. 14, user apparatus 80 includes communicator 81, transaction generator 82, obtainer 83, display 84, inputter 85, and memory device 86.

Communicator 81 is a communication interface apparatus connected to network N. User apparatus 80 is communicable with storage server 30 through communicator 81.

Transaction generator 82 is a processor which generates transaction data including information on the transmission and reception of tokens. The transaction data includes at least a user ID, a version number, a token price, and the electronic signature of the user. The electronic signature of the user is generated from the information included in the transaction data through encryption with the private key of the user. The user ID and the private key can be obtained by reading these from memory device 86 by transaction generator 82. Transaction generator 82 transmits the generated transaction data through communicator 81 to token management apparatus 70A. The token price represents the numerical quantity of token provided according to the transaction data.

Obtainer 83 is a processor which obtains software. For example, obtainer 83 transmits a request to obtain software, and obtains the software transmitted in response to the request. More specifically, obtainer 83 determines one version to be obtained (also referred to as requested version) among one or more versions stored in storage server 30, and transmits a request to obtain the software of the requested version through communicator 81 to storage server 30. Obtainer 83 receives the software of the requested version, which has been transmitted by storage server 30 in response to the request to obtain software, through communicator 81. Obtainer 83 may obtain the software, based on the reception in inputter 85 of an instruction to obtain the software from the user or based on another trigger (such as release of a new version). The requested version may be determined by the specification by the user, which is accepted by inputter 85, or may be determined to be a predetermined version of the software (such as the latest version, or a stable version whose stable operation is verified), for example.

Display 84 is a display screen on which images are displayed. Display 84 displays an image indicating a variety of pieces of information on user apparatus 80. Display 84 displays an image presenting to the user a question whether to obtain the software or not, for example.

Inputter 85 is an input interface which accepts an input from the user. Inputter 85 is, for example, a touch screen which is arranged so as to be superimposed on display 84 and accepts an input from touch operation of the user. Inputter 85 may also be a keyboard, a mouse, or a touch pad. Inputter 85 accepts an input of an instruction to obtain the software, for example.

Memory device 86 stores the information on the user. The information on the user specifically includes a user ID, i.e., the identification information identifying the user, and the key information of the user (including the private key). The user ID is the information which can uniquely identify the user. The user ID and the key information stored in memory device 86 are read by transaction generator 82.

Figure 15:
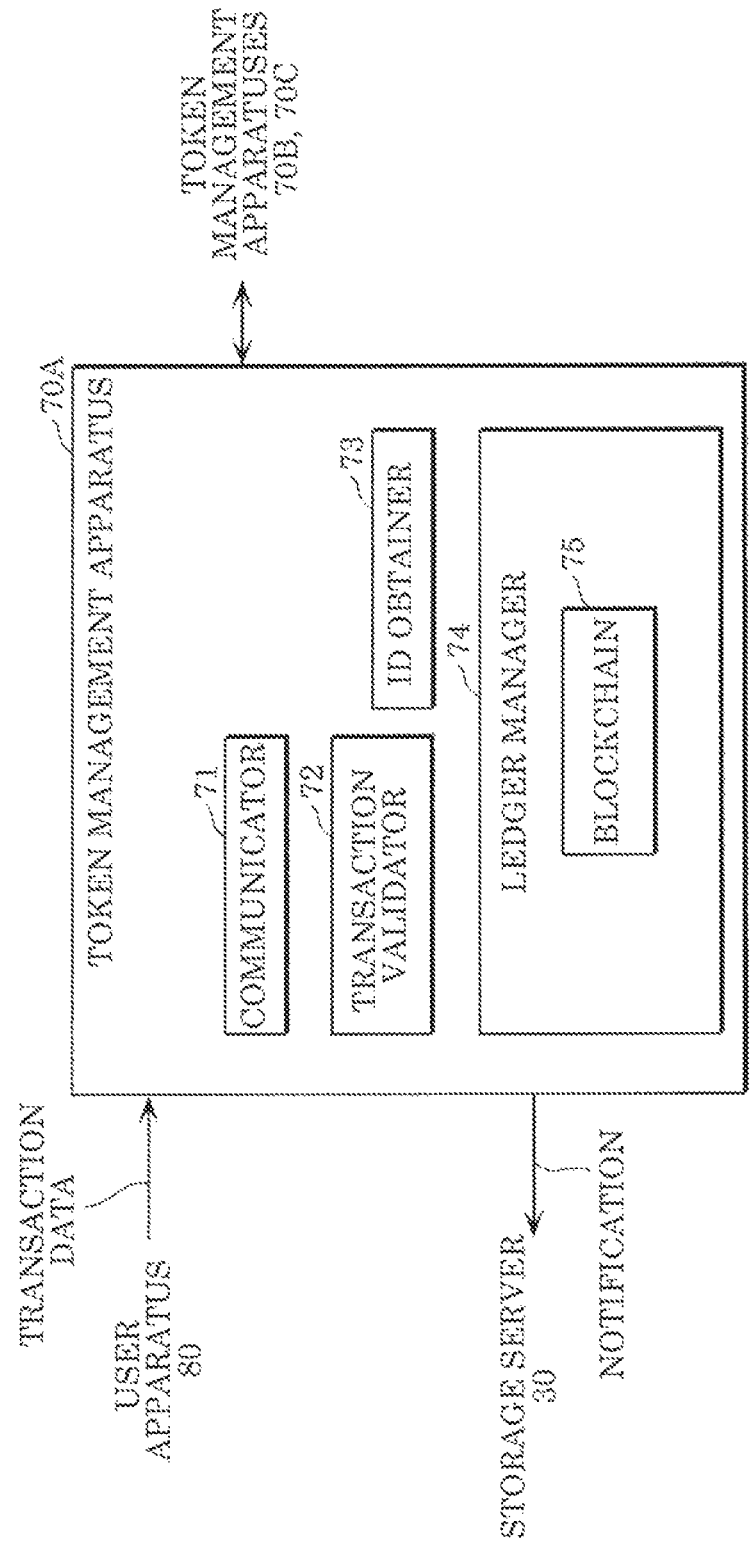
FIG. 15 is a diagram illustrating a configuration of a token management apparatus according to Embodiment 2.

FIG. 15 is a diagram illustrating a configuration of token management apparatus 70A according to the present embodiment.

As illustrated in FIG. 15, token management apparatus 70A includes communicator 71, transaction validator 72, ID obtainer 73, and ledger manager 74.

Communicator 71 is a communication interface apparatus connected to network N. Token management apparatus 70A is communicable with user apparatus 80, storage server 30, and other token management apparatuses 70B and 70C through communicator 71.

Transaction validator 72 is a processor which validates the legitimacy of the transaction data. Transaction validator 72 receives the transaction data through communicator 71 from user apparatus 80. The transaction data to be received includes a user ID, a version number, a token price, and the electronic signature of the user. When receiving the transaction data, transaction validator 72 validates the legitimacy of the transaction data using the electronic signature included in the received transaction data. The validation of the legitimacy of the transaction data is performed using the information included in the transaction data and the public key of the user, and it is determined whether the transaction data is legitimate or not. More specifically, it is determined that the transaction data has been surely generated by user apparatus 80 and that the transaction data has not been falsified from the generation. The validation of the legitimacy of the transaction data is also simply referred to as validation of the transaction data.

In the case where the transaction data obtained by transaction validator 72 does not include the software developer ID of the software developer of the requested version, ID obtainer 73 obtains the software developer ID.

ID obtainer 73 is a processor which obtains the software developer ID of the software developer of the requested version of the software. ID obtainer 73 determines whether the transaction data obtained by transaction validator 72 includes the software developer ID of the software developer of the requested version or not. In the case where the transaction data does not include the software developer ID, ID obtainer 73 asks management apparatus 10A the version number of the requested version included in the transaction data. In response to this inquiry, management apparatus 10A transmits the version number of the requested version to token management apparatus 70A (ID obtainer 73). When receiving the version number, ID obtainer 73 generates transaction data including the user ID, the version number, and the token price included in the transaction data received by transaction validator 72, as well as the software developer ID obtained from management apparatus 10A.

Ledger manager 74 is a processor which manages the distributed ledgers for managing the transmission and reception of tokens. Although an example where the distributed ledger is blockchain 75 will be described here, another type of distributed ledger (such as IOTA or hashgraph) may also be used.

When transaction validator 72 validates the transaction data and the transaction data does not include the software developer ID of the software developer of the requested version, ledger manager 74 stores the transaction data generated by ID obtainer 73 in blockchain 75. In contrast, when the transaction data includes the software developer ID of the software developer of the requested version, ledger manager 74 stores the transaction data validated by transaction validator 72 in blockchain 75. When storing the transaction data in blockchain 75, ledger manager 74 synchronizes the transaction data by transmitting the transaction data to other token management apparatuses 70B and 70C. Ledger manager 74 then executes a consensus algorithm between token management apparatus 70A and other token management apparatuses 70B and 70C. In the case where an agreement is generated by the consensus algorithm, ledger manager 74 generates a block including the transaction data, and stores the generated block in blockchain 75. The transaction data stored in blockchain 75 by ledger manager 74 is also referred to as first transaction data.

Although one example of consensus algorithms is Practical *Byzantine* Fault Tolerance (PBFT), any other consensus algorithms such as Proof of Work (PoW) or Proof of Stake (PoS) may also be used.

Figure 16:
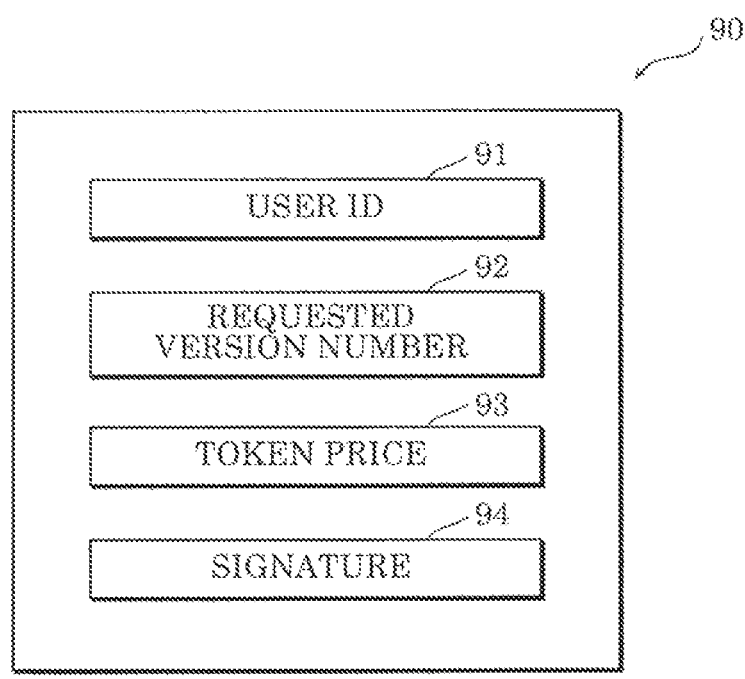
FIG. 16 is a diagram illustrating a first example of transaction data according to Embodiment 2.

FIG. 16 is a diagram illustrating transaction data 90 as a first example of the transaction data according to the present embodiment. Transaction data 90 is an example of the transaction data not including the software developer ID of the software developer of the version requested by the user. Transaction data 90 may be used in the case where user apparatus 80 does not possess the software developer ID.

As illustrated in FIG. 16, transaction data 90 includes user ID 91, requested version number 92, token price 93, and signature 94.

User ID 91 is an user ID of the user corresponding to user apparatus 80 as a transmission source of transaction data 90.

Requested version number 92 is a version number of the requested version or the version to be newly obtained by user apparatus 80 according to transaction data 90.

Token price 93 is a price of the tokens provided to the software developer by the user according to transaction data 90.

Signature 94 is an electronic signature generated from the information included in transaction data 90 through encryption with the private key of the user. Specifically, signature 94 is a value obtained as follows: A hash value is obtained by performing a hash operation on the information including user ID 91, requested version number 92, and token price 93, and is encrypted with the private key of the user.

When receiving transaction data 90, with reference to requested version number 92 included in transaction data 90, token management apparatus 70A obtains the identification information of the software developer of the version according to requested version number 92 from management apparatuses 10A and others, and controls the provision of the tokens from the user to the software developer.

Figures 17, 18:
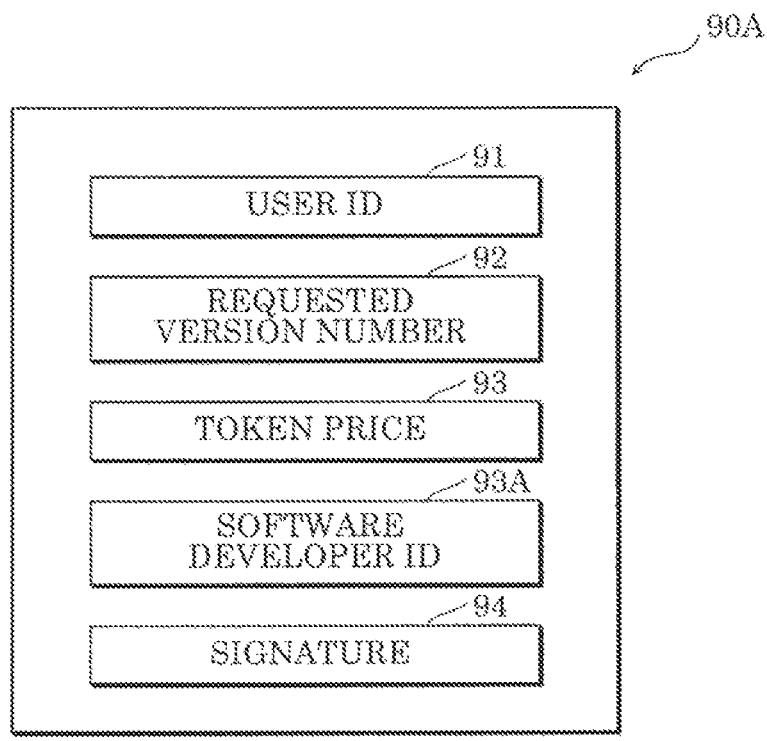
FIG. 17 is a diagram illustrating a second example of the transaction data according to Embodiment 2.
FIG. 18 is a diagram illustrating the transaction data stored in a blockchain according to Embodiment 2.

FIG. 17 is a diagram illustrating transaction data 90A as a second example of the transaction data according to the present embodiment. Transaction data 90A is an example of the transaction data including the software developer ID of the software developer of the version requested by the user. Transaction data 90A may be used in the case where user apparatus 80 possesses the software developer ID.

As illustrated in FIG. 17, transaction data 90A includes user ID 91, requested version number 92, token price 93, software developer ID 93A, and signature 94. Transaction data 90A corresponds to transaction data 90 including software developer ID 93A.

User ID 91, requested version number 92, and token price 93 are the same as those in transaction data 90.

Software developer ID 93A is the software developer ID of the software developer of the requested version or the version to be newly obtained by the user according to transaction data 90A.

Signature 94 is an electronic signature generated from the information included in transaction data 90A through encryption with the private key of the user. Specifically, signature 94 is a value obtained as follows: A hash value is obtained by performing a hash operation on the information including user ID 91, requested version number 92, token price 93, and software developer ID 93A, and is encrypted with the private key of the user.

When receiving transaction data 90A, with reference to requested version number 92 and software developer ID 93A included in transaction data 90A, token management apparatus 70A determines that the software developer of requested version number 92 is surely the software developer shown in software developer ID 93A, and controls the transmission and reception of tokens.

Token management apparatus 70A may control the transmission and reception of tokens without performing the determination above. Such control is also enabled in the case where the legitimacy of software developer ID 93A included in transaction data 90A is guaranteed.

FIG. 18 is a diagram illustrating the transaction data stored in blockchain 75 according to the present embodiment. FIG. 18 specifically illustrates the transaction data managed by token management apparatuses 70A and others according to blockchain 75. One entry (one row) shown in FIG. 18 corresponds to one piece of transaction data. The data located in a lower portion of FIG. 18 is newer transaction data.

As illustrated in FIG. 18, each piece of transaction data includes the information indicating the token price, the sender of the tokens, and the destination of the tokens as the information on the transmission and reception of the tokens.

The sender and the token price in the transaction data illustrated in FIG. 18 correspond to user ID 91 and token price 93 included in transaction data 90 illustrated in FIG. 16, respectively. The sender, the destination, and the token price in the transaction data illustrated in FIG. 18 correspond to user ID 91, software developer ID 93A and token price 93 included in transaction data 90A illustrated in FIG. 17, respectively.

As in FIG. 18, blockchain 75 stores the information on the transmission and reception of the tokens when the software is provided in the past from the current time. Specifically, blockchain 75 stores the information indicating that user A provided 50 tokens (i.e., tokens equivalent to a token price of 50) to software developer X, and the like.

Token management apparatus 70A manages the information on the transmission and reception of the tokens when the software is provided in the past from the current time such that the information is not falsified, because the blockchain is difficult to falsify.

Processing of management system 2 will now be described. The processing of management system 2 will be described as the following two cases, that is, (1) the case where user apparatus 80 transmits the transaction data not including the software developer ID, and (2) the case where user apparatus 80 transmits the transaction data including the software developer ID.

(1) An example where user apparatus 80 transmits the transaction data not including the software developer ID of the software developer of the version requested by the user (see FIG. 16) will be described.

In this case, user apparatus 80 transmits the transaction data to token management apparatus 70A, the transaction data including request information (also referred to as second transaction data) and further including the identification information identifying the user as a sender of the predetermined number of tokens. From management apparatus 10A, token management apparatus 70A obtains the identification information of the software developer of the requested version indicated by the request information included in the second transaction data. When storing the first transaction data in blockchain 75, token management apparatus 70A generates first transaction data which includes the identification information identifying the user as the sender which is included in the second transaction data, as a sender of the predetermined number of tokens and the identification information obtained from management apparatus 10A as a destination of the predetermined number of tokens. Token management apparatuses 70A and others each store the generated first transaction data in blockchain 75.

Figure 19:
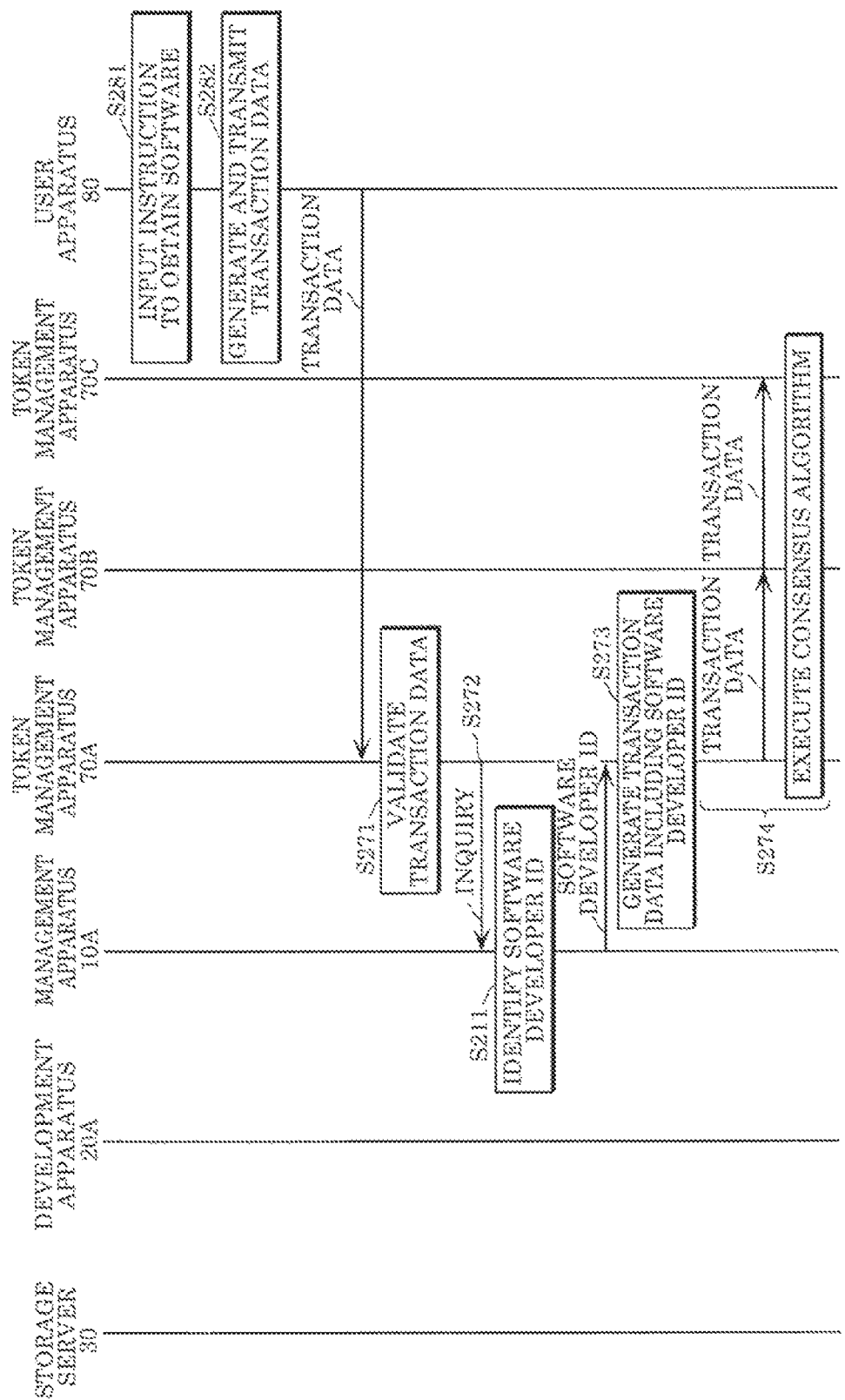
FIG. 19 is a sequence diagram illustrating first processing in the management system according to Embodiment 2.
Figure 20:
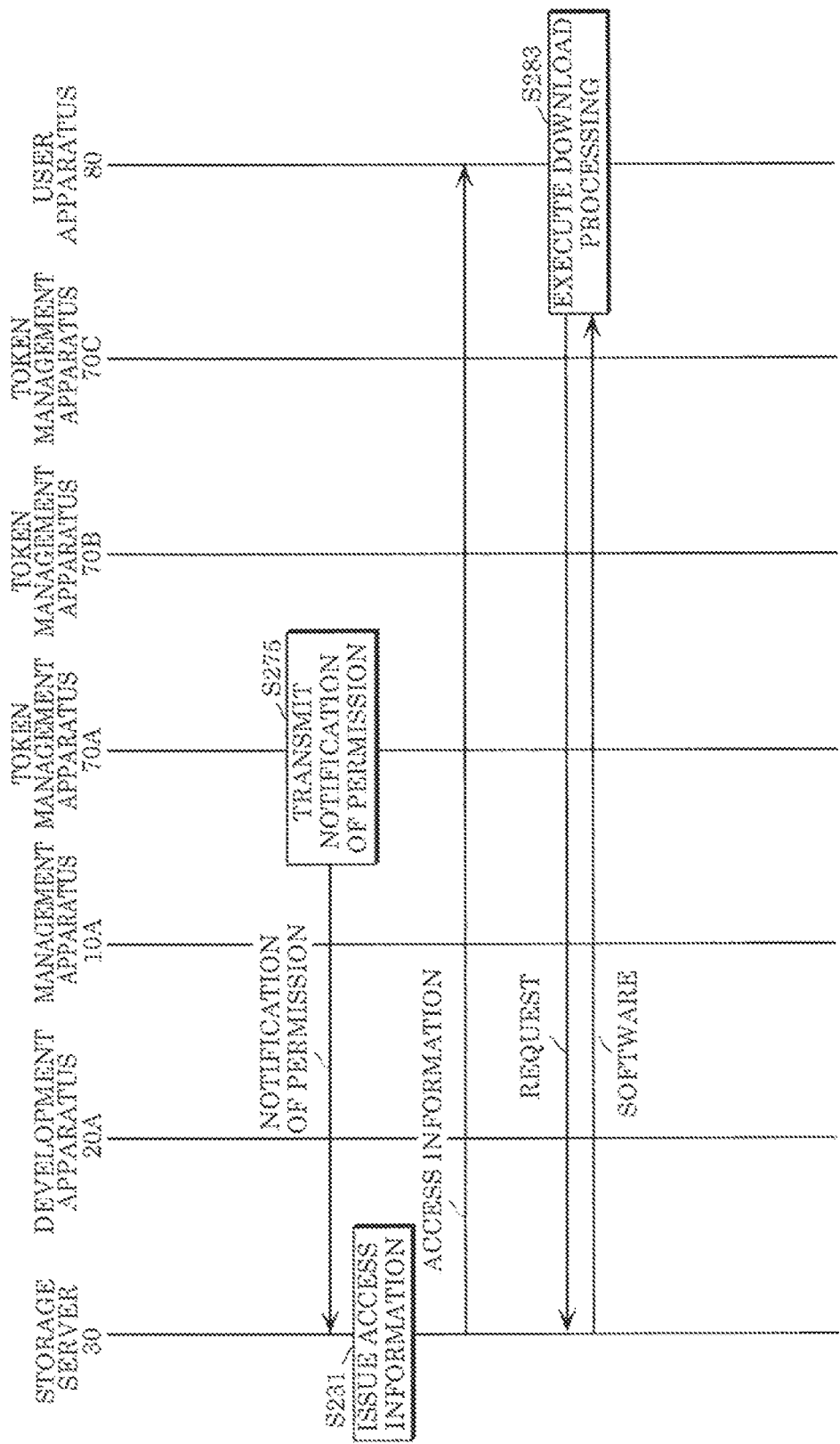
FIG. 20 is a sequence diagram illustrating second processing in the management system according to Embodiment 2.

FIGS. 19 and 20 are sequence diagrams illustrating the processing of management system 2 according to the present embodiment.

As illustrated in FIG. 19, in step S281, user apparatus 80 accepts a user's input of an instruction to obtain a new version of the software.

In step S282, user apparatus 80 generates transaction data for obtaining the new version of the software, and transmits it to token management apparatus 70A. This transaction data does not include the software developer ID of the software developer of the version requested by the user.

In step S271, token management apparatus 70A receives the transaction data transmitted from user apparatus 80 in step S281, and validates the received transaction data. Here, assume that from the result of the validation of the transaction data, token management apparatus 70A determines that the transaction data is legitimate. Token management apparatus 70A determines that the transaction data does not include the software developer ID.

In step S272, token management apparatus 70A transmits a communication packet for inquiry of the software developer ID of the software developer of the version requested by the user to management apparatus 10A. The communication packet includes at least the requested version number.

In step S211, management apparatus 10A receives the communication packet for inquiry transmitted in step S272, and identifies the software developer ID of the software developer of the version requested by the user with reference to blockchain 15 managed by ledger manager 14. Management apparatus 10A transmits the communication packet including the identified software developer ID to token management apparatus 70A.

In step S273, token management apparatus 70A receives the communication packet transmitted in step S211, and obtains the software developer ID included in the received packet. Token management apparatus 70A generates the transaction data including user ID 91, requested version number 92, and token price 93 of the transaction data (see FIG. 16) received in step S271 and the software developer ID obtained above. The generated transaction data has the form of transaction data 90A in FIG. 17.

In step S274, token management apparatus 70A transmits the transaction data generated in step S273 to token management apparatuses 70B and 70C. The block including the transaction data is then stored in blockchain 75 through execution of the consensus algorithm by token management apparatuses 70A and others. As a result, the information on the version requested by the user, more specifically, the user ID, the requested version number, the token price, and the software developer ID are stored in blockchain 75, thereby obstructing the falsification of the information after the storage thereof.

With reference to FIG. 20, in step S275, token management apparatus 70A transmits a communication packet to storage server 30, the communication packet including a notification indicating a permission to provide the software to the user (also referred to as notification of permission).

In step S231, storage server 30 issues access information, and transmits the communication packet including the access information to user apparatus 80. Here, the access information refers to the information needed for user apparatus 80 to download the software stored in storage server 30, and includes at least location information indicating the location where the software is stored (specifically, the URL) and authentication information. The authentication information indicates the user ID and the password, for example.

In step S283, user apparatus 80 receives the communication packet transmitted in step S231, and downloads the software based on the access information included in the communication packet. Specifically, using the authentication information, user apparatus 80 accesses to the location indicated in the location information included in the access information, and downloads the software.

(2) An example where user apparatus 80 transmits the transaction data including the software developer ID of the software developer of the version requested by the user (see FIG. 17) will be described.

In this case, user apparatus 80 transmits first transaction data to token management apparatus 70A, the first transaction data including the identification information identifying the user as the sender of the predetermined number of tokens and the identification information of the software developer of the requested version as the destination of the predetermined number of tokens. When storing the first transaction data in blockchain 75, token management apparatus 70A stores the first transaction data received from user apparatus 80 in blockchain 75.

Figure 21:
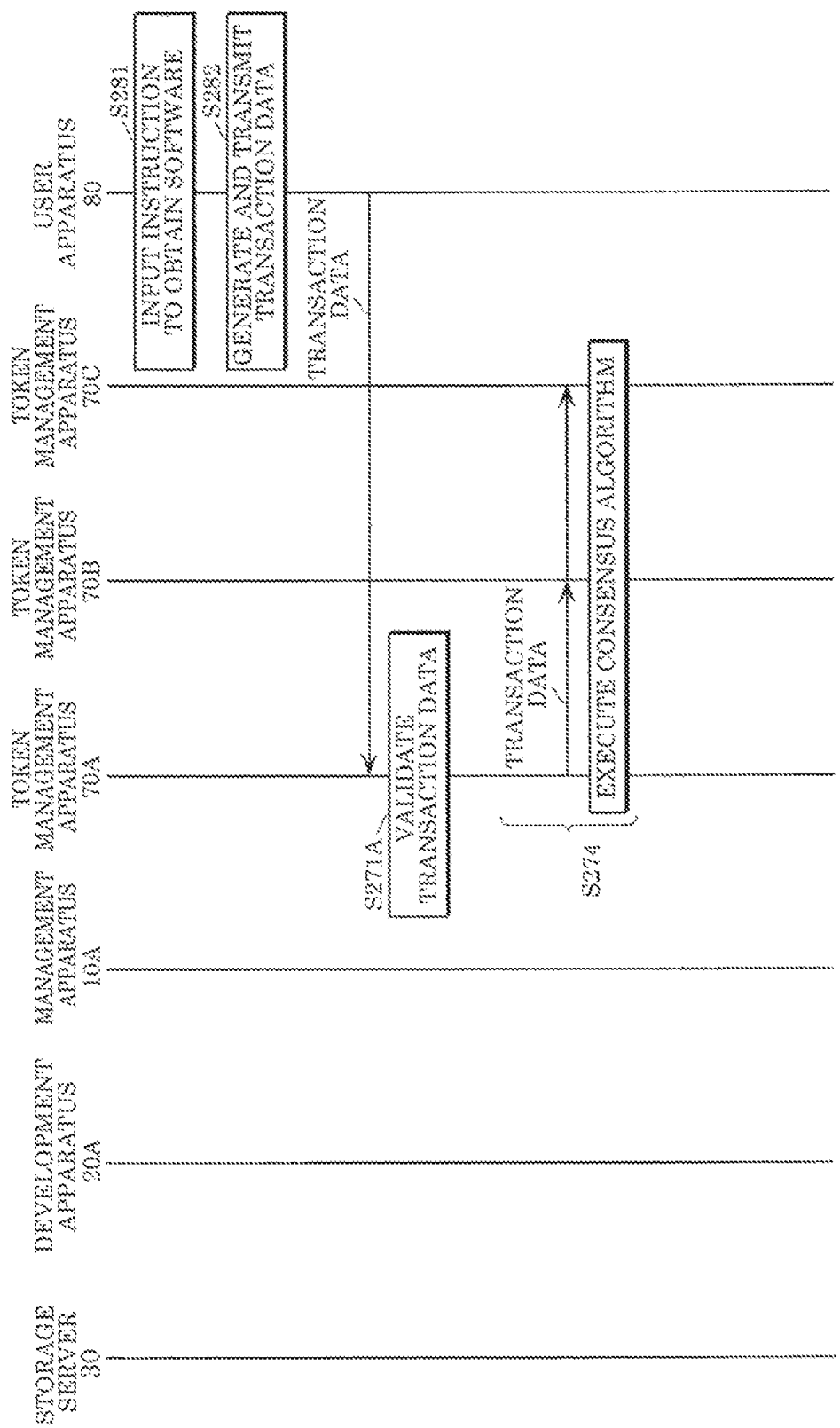
FIG. 21 is a sequence diagram illustrating third processing in the management system according to Embodiment 2.

FIG. 21 is a sequence diagram illustrating third processing in management system 2 according to the present embodiment. Steps S281 and S282 illustrated in FIG. 21 are the same as those in the processing in FIG. 19.

In step S271A, token management apparatus 70A receives the transaction data transmitted from user apparatus 80 in step S282, and validates the received transaction data. Here, assume that from the result of the validation of the transaction data, token management apparatus 70A determines that the transaction data is legitimate. Token management apparatus 70A determines that the transaction data includes the software developer ID.

In step S274, token management apparatus 70A transmits the transaction data received in step S271A to token management apparatuses 70B and 70C. The block including the transaction data is then stored in blockchain 75 through execution of the consensus algorithm by token management apparatuses 70A and others. As a result, the information on the version requested by the user, more specifically, the user ID, the requested version number, the token price, and the software developer ID are stored in blockchain 75, thereby obstructing the falsification of the information after the storage thereof.

After step S274, a series of processing illustrated in FIG. 20 is executed.

In the series of processing illustrated in FIG. 21, token management apparatus 70A may further determine whether the software developer ID included in the transaction data obtained from user apparatus 80 is surely the software developer ID of the software developer of the requested version included in the transaction data, and then may store the transaction data in the blockchain.

In other words, token management apparatus 70A may obtain first identification information, which is the identification information of the software developer of the requested version indicated by the request information included in the first transaction data, from management apparatus 10A, and may store the first transaction data in blockchain 75 only when the first identification information matches the second identification information, which is the identification information included in the first transaction data.

The sequence of the processing in this case will now be described.

Figure 22:
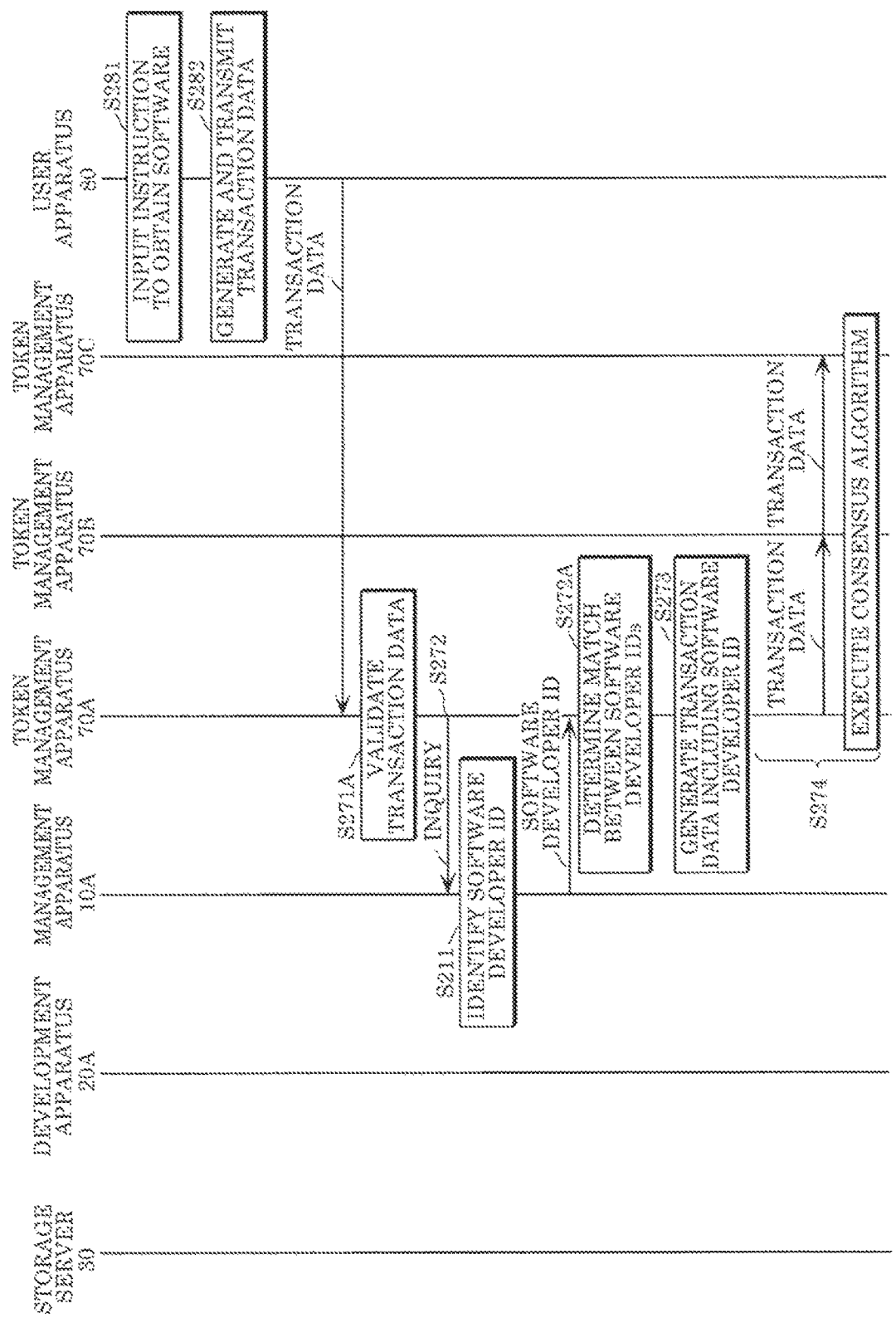
FIG. 22 is a sequence diagram illustrating fourth processing in the management system according to Embodiment 2.

FIG. 22 is a sequence diagram illustrating fourth processing in management system 2 according to the present embodiment. Among the steps illustrated in FIG. 22, those other than steps S271A and S272A are the same as those in the processing in FIG. 19 or 21.

In the processing illustrated in FIG. 22, in the case where token management apparatus 70A determines in step S271A that the transaction data includes the software developer ID, token management apparatus 70A transmits a communication packet for inquiry of the software developer ID to management apparatus 10A (step S272), and obtains the software developer ID.

In step S272A, token management apparatus 70A determines whether the software developer ID obtained from management apparatus 10A (corresponding to the first identification information) matches the software developer ID included in the transaction data received from user apparatus 80 in step S271A (corresponding to the second identification information). Token management apparatus 70A then stores the block including the transaction data received in step S271A in blockchain 75 only when there is a match between these two software developer IDs.

Such a configuration can prevent the storage of the transaction data in blockchain 75 when the software developer ID obtained from user apparatus 80 does not match the software developer ID managed in management apparatus 10A, that is, when the software developer ID has a problem.

The processing of token management apparatuses 70A and others may be implemented by a smart contract. In other words, ledger manager 74 in token management apparatus 70A stores a blockchain including the transaction data including smart contract codes, which are program codes for the smart contract. When user apparatus 80 transmits the transaction data in step S282, user apparatus 80 transmits the transaction data which requires the execution of the smart contract. As a result, the program codes are executed by the smart contract, thereby executing the processing of token management apparatuses 70A and others illustrated in FIG. 19 or 21, and FIG. 20.

In such a configuration, the program is executed in response to the transmission of the transaction data by user apparatus 80, executing the series of processing. As a result, the result obtained through the execution of the program is stored in the blockchain, advantageously obstructing the falsification of the result of the series of processing.

As described above, in the management method according to the present embodiment, the distributed ledger manages provision of the tokens from the user to the software developer of the new version of the software. The distributed ledger is advantageous in obstructing the falsification of the possessed information and in reducing influences by the system failure. For this reason, the management of the transmission and reception of the tokens by the distributed ledger prevents the falsification of the history of the transmission and reception of the tokens and the missing of the history. Thus, the management method for software versions can improve the transaction safety of the software.

Moreover, the identification information of the software developer of the requested version received from a user apparatus using the second transaction data is obtained from the version management apparatus, and the identification information of the software developer is used as the destination of the tokens. Thereby, the distributed ledger manages provision of the tokens from the user to the software developer of the new version of the software even when the user does not know the software developer of the requested version, that is, when the user apparatus does not possess the identification information of the software developer. Thus, the transaction safety of the software can be improved even when the user does not know the software developer of the requested version.

Moreover, the transaction data indicating the provision of the tokens from the user apparatus to the software developer of the requested version is transmitted from the user apparatus to the token management apparatus. Thus, the distributed ledger manages the provision of the tokens from the user to the software developer of the new version of the software even when the token management apparatus does not obtain the information on the software developer of the requested version from another apparatus. Accordingly, the transaction safety of the software can be improved even when the token management apparatus does not obtain the information on the software developer of the requested version from another apparatus.

Moreover, the identification information of the software developer of the requested version received from the user apparatus using the first transaction data is stored and managed in the distributed ledger only when this identification information matches the identification information of the software developer managed in the version management apparatus. Accordingly, if the identification information of the software developer possessed by the user apparatus is not correct (i.e., is an error, or is invalid), the tokens are not provided from the user to the software developer. This prevents the provision of the tokens to a false software developer. Thus, the transaction safety of the software can be improved by preventing the provision of the tokens to a dishonest software developer when the information possessed in the user apparatus is false.

Moreover, after the provision of the tokens from the user to the software developer is managed by the distributed ledger, the software of the requested version is provided to the user. Thus, a transaction is performed more safely in which the software is provided in exchange for the tokens provided from the user apparatus. Accordingly, the transaction safety of the software can be further improved.

Moreover, the series of processing such as the provision of the tokens from the user to the software developer is automatically executed based on the smart contract codes stored in the distributed ledger without intervention by any other person or system. Thus, the series of processing can be implemented with higher safety by the smart contract. Accordingly, the transaction safety of the software can be further improved.

Moreover, the version management apparatuses manages the software developer of the versions of the software according to the distributed ledgers, and the information of the software developer is used as the destination of the tokens. The distributed ledger is advantageous in obstructing the falsification of the possessed information and in reducing influences by the system failure. Thus, the falsification of the information of the software developer of the version can be prevented, further improving the transaction safety of the software.

Embodiment 3

In the present embodiment, a management method for software versions will be described in which the transaction safety of software is improved. In particular, an improvement in transaction safety when tokens are distributed and provided to several software developers of the software will be described.

Figure 23:
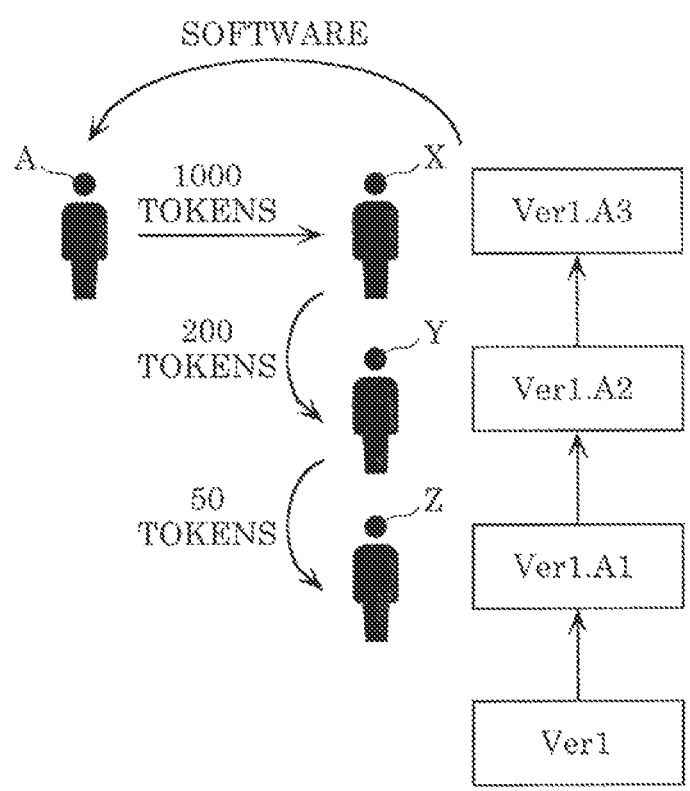
FIG. 23 is a diagram illustrating a method of providing tokens in a management system according to Embodiment 3.

FIG. 23 is a diagram illustrating a method of providing tokens in management system 2 according to the present embodiment.

As illustrated in FIG. 23, assume that versions 1.A1, 1.A2, and 1.A3 are developed in this order based on version 1. Here, the software developers of versions 1.A1, 1.A2, and 1.A3 are software developer X, Y, and Z, respectively. In this case, although software developer Z is directly responsible for the development of version 1.A3, it is considered that the software developers X and Y of versions 1.A1 and 1.A2 underlying the development also contribute to the development of version 1.A3.

In this consideration, it is appropriate that not only software developer Z but also software developers X and Y receive tokens when version 1.A3 of the software is provided to user A.

For example, as illustrated in FIG. 23, in the case where user A provides 1000 tokens to software developer Z in exchange for the obtained version 1.A3 of the software, it is appropriate that 200 tokens of the 1000 tokens are provided to software developer Y and 50 tokens of the 200 tokens are provided to software developer Z.

Such a method of providing tokens will be described.

The entire configuration of the management system according to the present embodiment is the same as that in management system 2 according to Embodiment 2.

The management system according to the present embodiment includes management apparatuses 10D, 10E, and 10F (also referred to as management apparatuses 10D and others) rather than management apparatuses 10A and others according to Embodiment 2, and includes token management apparatuses 70D, 70E, and 70F (also referred to as token management apparatuses 70D and others) rather than token management apparatuses 70A and others according to Embodiment 2. These apparatuses will now be described.

Figure 24:
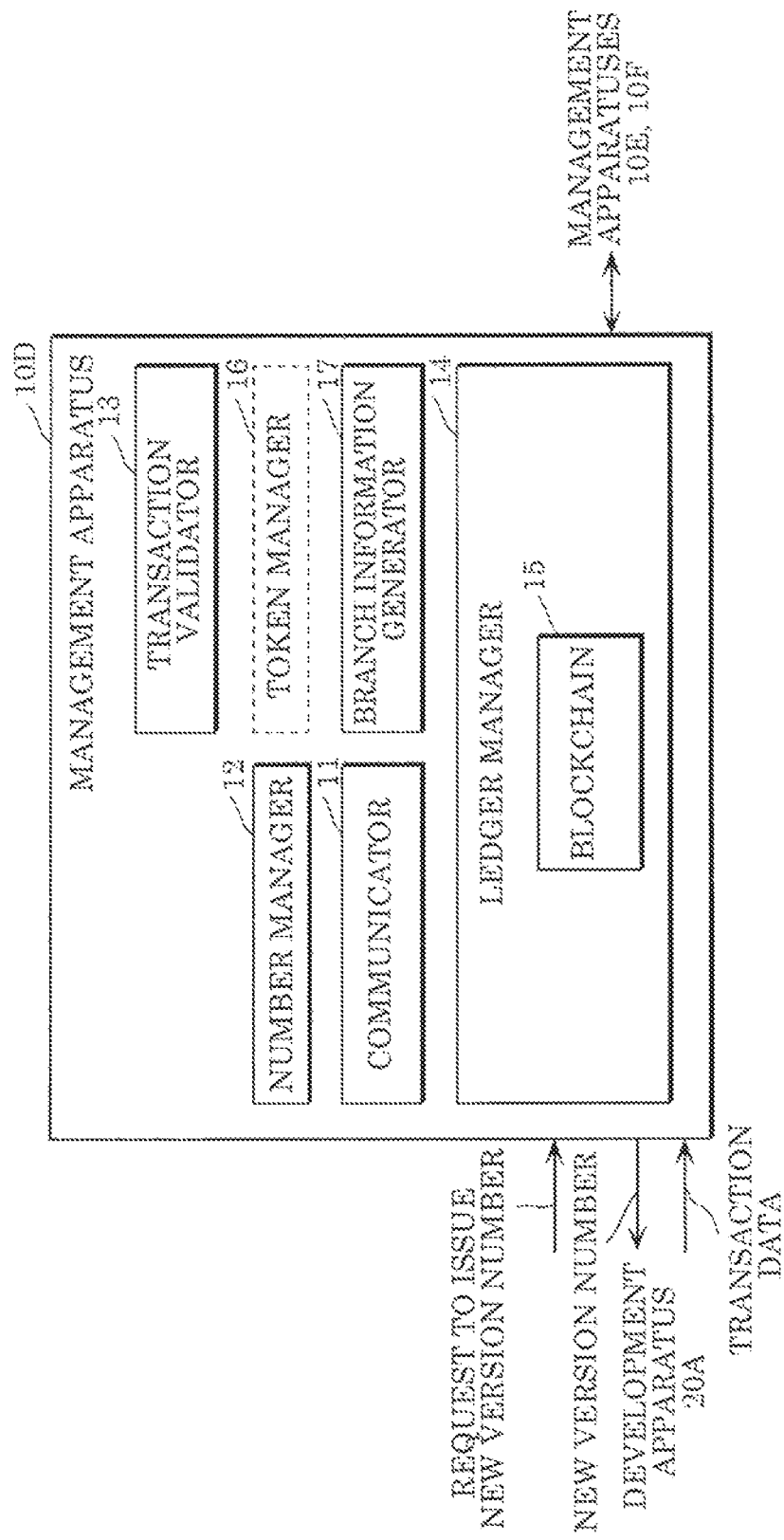
FIG. 24 is a diagram illustrating a configuration of the management apparatus according to Embodiment 3.

FIG. 24 is a diagram illustrating a configuration of management apparatus 10D according to the present embodiment.

As illustrated in FIG. 24, management apparatus 10D includes branch information generator 17 in addition to the components of management apparatus 10A according to Embodiment 2.

Branch information generator 17 is a processor which generates branch information indicating the history of development of versions. Branch information generator 17 receives a version number of a requested version from token management apparatus 70D through communicator 11, and then generates the branch information indicating the history of the requested version with reference to blockchain 15 managed by ledger manager 14. Branch information generator 17 then transmits the generated branch information to token management apparatus 70D.

Figure 25:
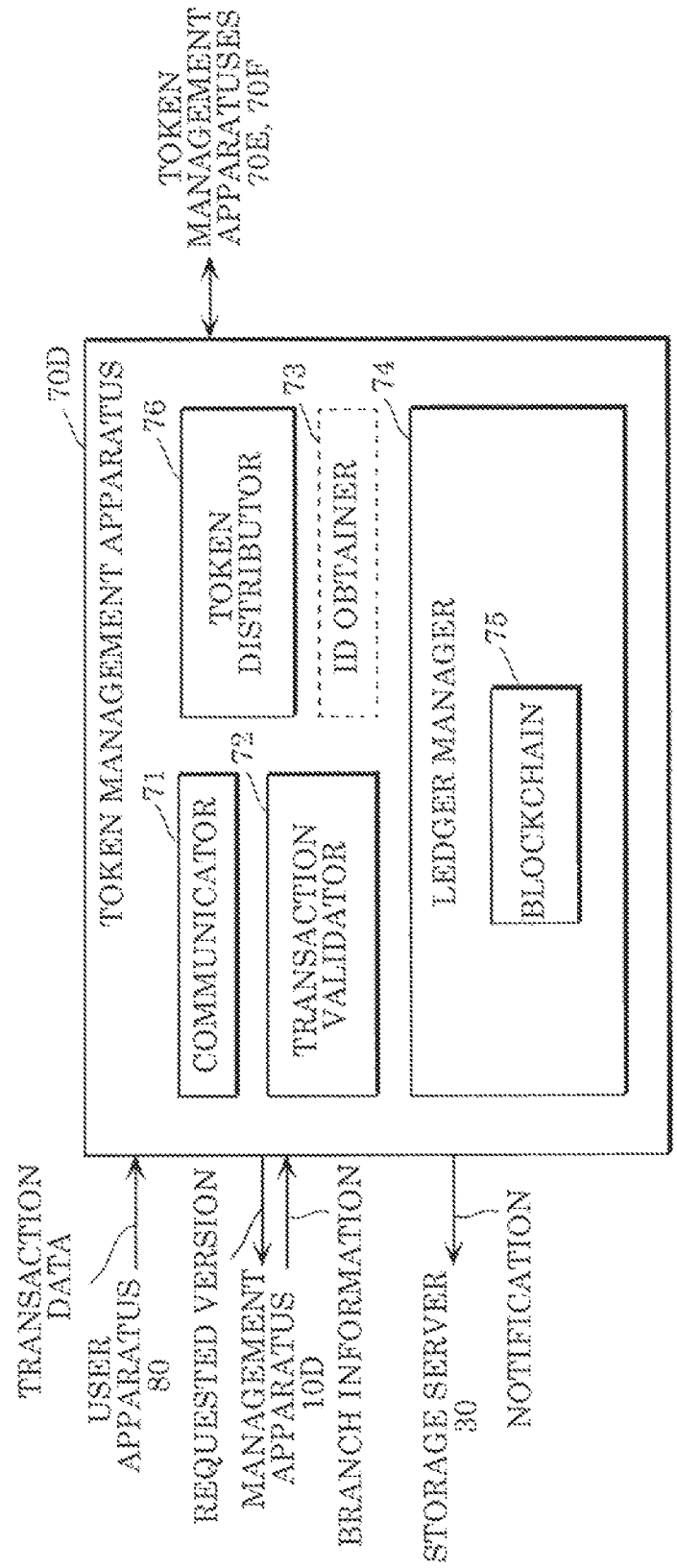
FIG. 25 is a diagram illustrating a configuration of a token management apparatus according to Embodiment 3.

FIG. 25 is a diagram illustrating a configuration of token management apparatus 70D according to the present embodiment.

As illustrated in FIG. 25, token management apparatus 70D includes token distributor 76 in addition to the components of token management apparatus 70A according to Embodiment 2.

Token distributor 76 is a processor which performs processing to distribute the tokens provided from a user to two or more software developers. Token distributor 76 receives transaction data from user apparatus 80, the transaction data indicating that tokens are provided from a user to a software developer. Token distributor 76 then obtains branch information from management apparatus 10D, and generates two or more pieces of transaction data based on the obtained branch information such that the tokens provided from the user are distributed to the two or more software developers. Token distributor 76 transmits a communication packet including at least a requested version to management apparatus 10D to obtain the branch information from management apparatus 10D. The two or more pieces of transaction data generated by token distributor 76 are subjected to the consensus algorithm by token management apparatuses 70D and others, and are stored in blockchain 75 by ledger manager 74.

FIG. 26 is a diagram illustrating one example of the branch information according to the present embodiment. FIG. 26 illustrates branch information table T1 shown as one example of a table of the branch information. Although branch information table T1 shows the branch information of two previous versions of a requested version as an example, it may be the branch information of one previous version of the requested version or may be the branch information of three or more previous versions of the requested version.

Branch information table T1 shows the version numbers and the software developers for the requested version, the first-previous version of the requested version as a version underlying the development thereof, and the second-previous version of the requested version.

Specifically, branch information table T1 shows that the software developer of version 1.A3 or the requested version is software developer Z. It also shows that the software developers of the first- and second-previous versions of the requested version (i.e., versions 1.A2 and 1.A3) are software developers Y and X, respectively.

FIG. 27 is a diagram illustrating an example of two or more pieces of transaction data for distributing tokens according to the present embodiment. FIG. 27 is specifically transaction data managed by token management apparatuses 70D and others according to blockchain 75, the transaction data indicating that the tokens provided by user A are distributed to software developers X, Y, and Z. The format of the transaction data illustrated in FIG. 27 is the same as that in FIG. 18, where one entry (one row) corresponds to one piece of transaction data.

Specifically, transaction data 101 illustrated in FIG. 27 indicates that 1000 tokens are provided from user A to software developer Z. Transaction data 102 indicates that 200 tokens are provided from software developer Z to software developer Y. Transaction data 103 indicates that 50 tokens are provided from software developer Y to software developer X. According to the three pieces of transaction data above, token management apparatuses 70D and others perform the management as follows: 1000 tokens are provided from user A to software developer Z in exchange for the software of the requested version obtained by user A, 200 tokens are provided from software developer Z to software developer Y, and 50 tokens are provided from software developer Y to software developer X.

Here, the ratio of the tokens distributed and provided to the software developers is also referred to as distribution ratio. In this example, the distribution ratio is represented as Z:Y:X=1000:200:50. The distribution ratio may be represented as Z:Y:X=800:150:50 where the token price provided from each software developer is subtracted from the token price received by the software developer.

In such a case where the two or more software developers include software developers of versions older than the requested version, the distribution ratio in the software developers of the requested version and its older versions may be controlled such that a smaller number of tokens are distributed to the software developer of an older version. This is because an appropriate distribution ratio of the token should be set according to the degree of contribution to the development of the version.

The tokens are distributed and provided from user A to software developers X, Y, and Z by storing the three pieces of transaction data shown in FIG. 27 in blockchain 75, thereby preventing the falsification of the transaction data thereafter.

Figure 28:
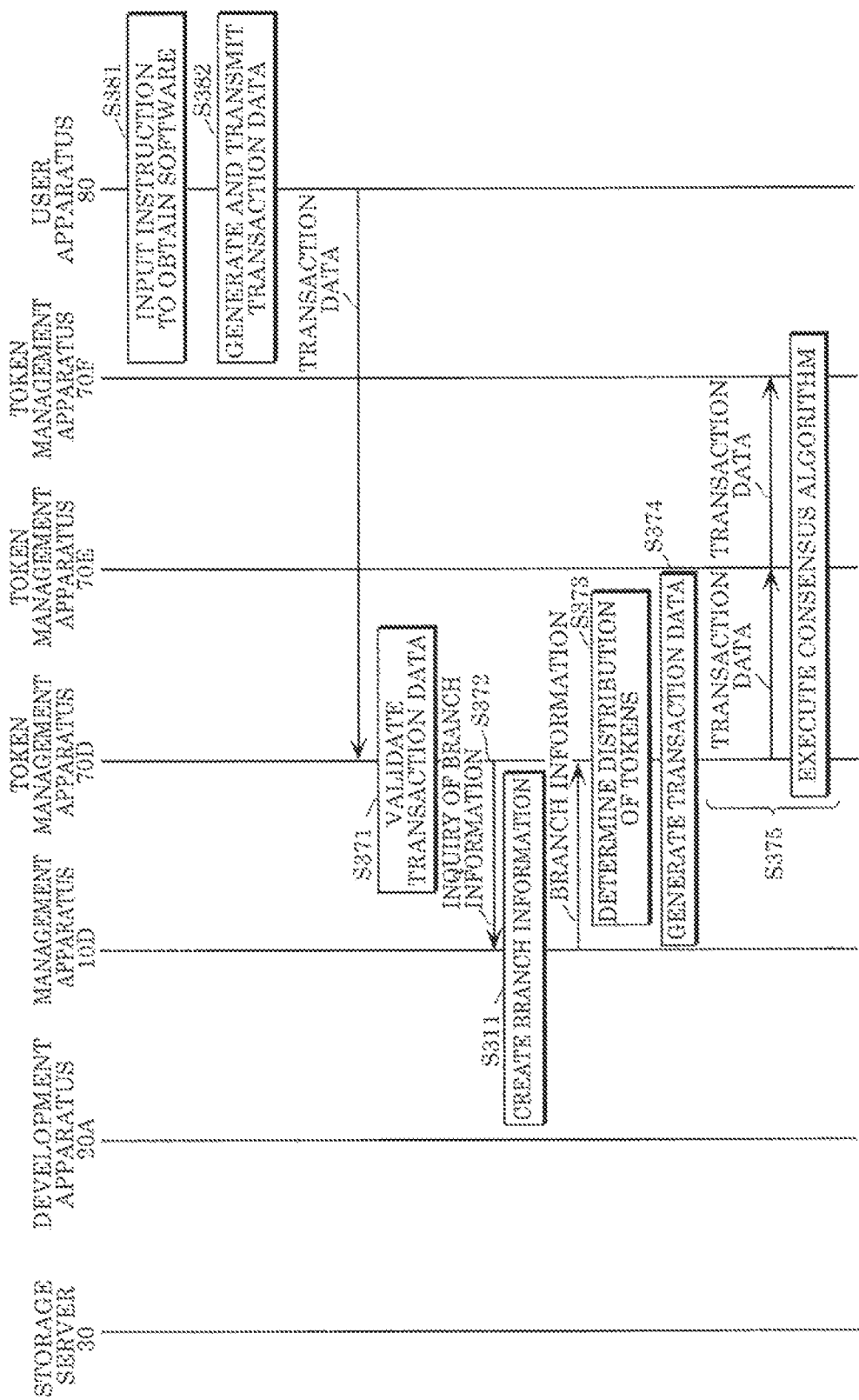
FIG. 28 is a sequence diagram illustrating processing in the management system according to Embodiment 3.

FIG. 28 is a sequence diagram illustrating processing in the management system according to the present embodiment.

As illustrated in FIG. 28, steps S381, S382, and S371 are the same as steps S281, S282, and S271 in FIG. 19.

In step S372, token management apparatus 70D transmits a communication packet including an inquiry about the branch information to management apparatus 10D. This communication packet includes at least the version number of the requested version.

In step S311, management apparatus 10D obtains the version number of the requested version from the communication packet transmitted from step S372, creates the branch information indicating the version history to the requested version, and transmits the branch information to token management apparatus 70D. For example, in the case where the requested version is version 1.A3 illustrated in FIG. 23, the branch information including versions 1.A1 and 1.A2 is created.

In step S373, token management apparatus 70D determines the distribution ratio of the tokens based on the history information.

In step S374, according to the distribution ratio of the tokens determined in step S373, token management apparatus 70D generates two or more pieces of transaction data indicating that the tokens are provided from the user to the software developers.

In step S375, token management apparatus 70D transmits the transaction data generated in step S374 to token management apparatuses 70E and 70F. The block including the transaction data is then stored in blockchain 75 through execution of the consensus algorithm by token management apparatuses 70D and others. Thereby, the information on the tokens provided from the user to several software developers is stored in blockchain 75, obstructing the falsification of the information thereafter.

The blockchain in the embodiments above will be complementally described.

Figure 29:
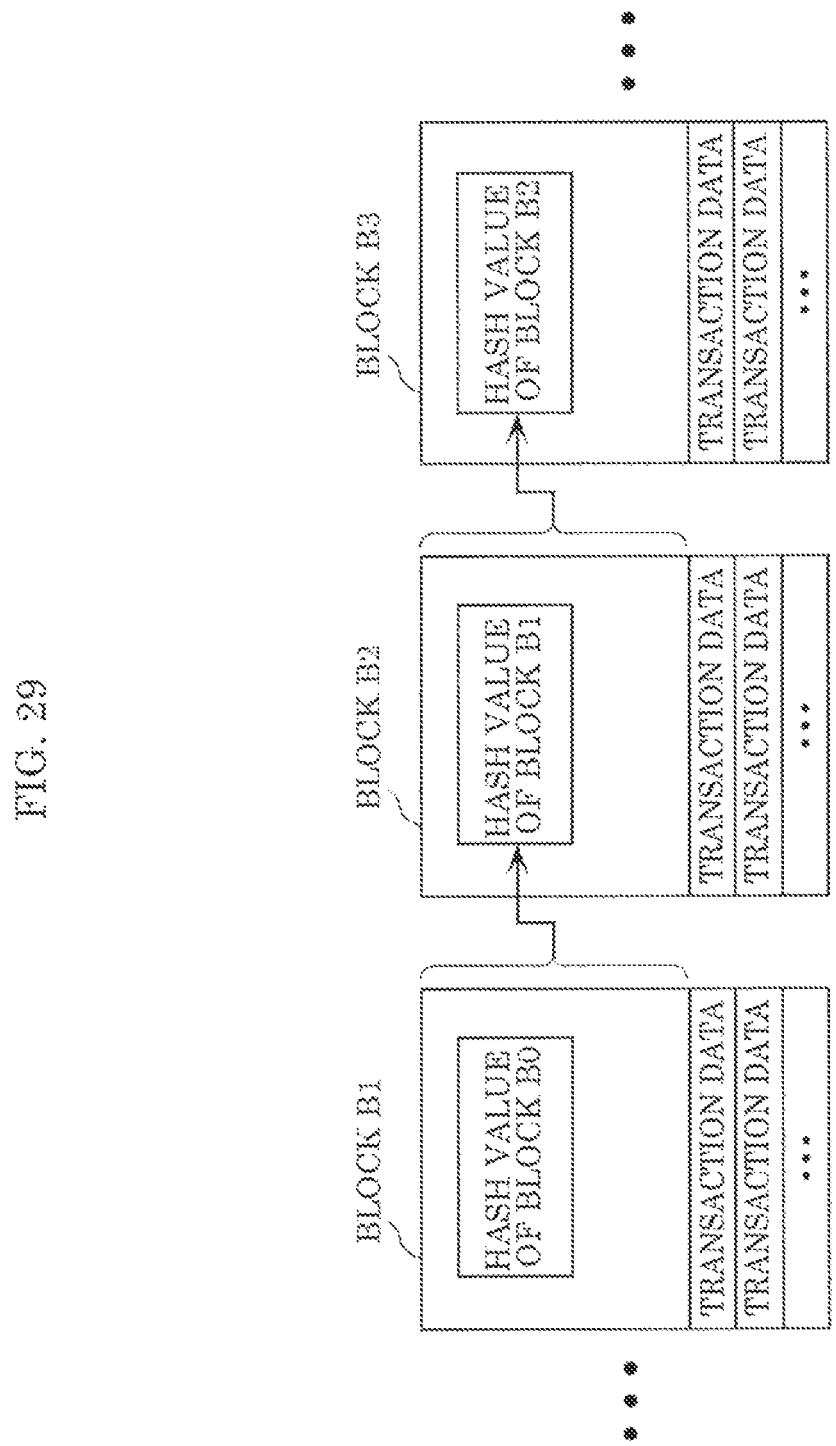
FIG. 29 is a diagram illustrating a data structure of a blockchain.

FIG. 29 is a diagram illustrating a data structure of the blockchain.

The blockchain is composed of blocks (recording unit) connected on a chain. One block has pieces of transaction data and a hash value of a block immediately before the one block. Specifically, block B2 includes the hash value of block B1 immediately before block B2. The hash value obtained from an arithmetic operation performed on the pieces of transaction data included in block B2 and the hash value of block B1 is included in block B3 as the hash value of block B2. Thus, the blocks are connected into a chain while the contents of the previous blocks are included as hash values, thereby effectively preventing the falsification of the recorded transaction data.

Any change in the transaction data in the past will result in a hash value of the block different from that before the change. To look the falsified block legitimate, all the blocks thereafter should be regenerated. This regeneration is very difficult in reality. Such properties ensure the difficulties in falsification of the blockchain.

Figure 30:
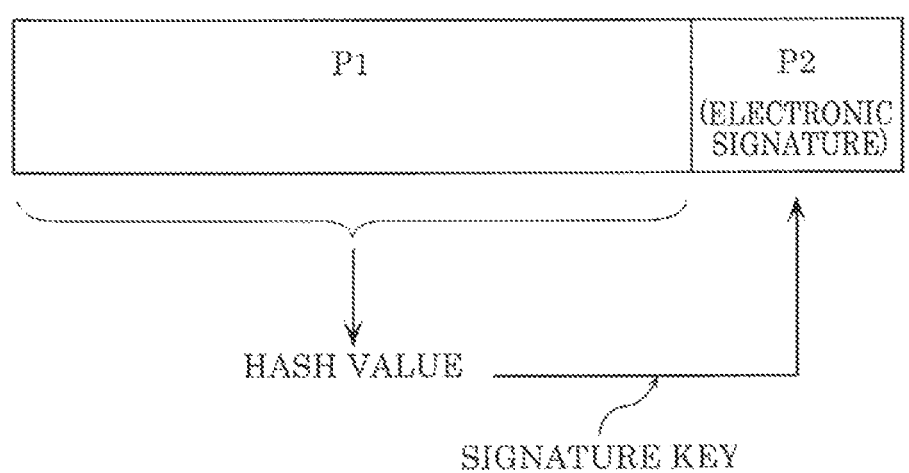
FIG. 30 is a diagram illustrating a data structure of transaction data.

FIG. 30 is a diagram illustrating a data structure of the transaction data.

The transaction data illustrated in FIG. 30 includes transaction body P1 and electronic signature P2. Transaction body P1 is a body of data included in the transaction data. Electronic signature P2 is generated by signing on the hash value of transaction body P1 with the signature key of the creator of the transaction data, more specifically, encrypting the hash value with the private key of the creator.

Because the transaction data has electronic signature P2, the falsification is substantially impossible. Thus, electronic signature P2 prevents the falsification of the transaction body.

As described above, in the management method according to the present embodiment, in the case where two or more software developers are responsible for the development of the requested version, the distribution and provision of the tokens from the user to the two or more software developers is managed by the distributed ledger. Accordingly, the transaction safety of the software can be improved even when two or more software developers are responsible for the development of the requested version.

Moreover, when two or more software developers are responsible for the development of the requested version, tokens can be provided in the distribution ratio such that a smaller number of tokens are provided to a software developer of an older version, in other words, a larger number of tokens are provided to a software developer of a newer version. In general, it is considered that a software developer of a version closer to the requested version or a newer version has greater contribution to the development of the requested version. The management method according to the present embodiment can implement such a distribution ratio of tokens according to the degree of contribution. Accordingly, the transaction safety of the software can be further improved through the distribution of the tokens according to the degree of contribution of each of the two or more software developers responsible to the development of the requested version.

In the embodiments above, the components may be implemented as dedicated hardware, or may be implemented by executing software programs suitable for the components. The components each may be implemented by a program executer, such as a CPU or a processor, which reads and executes the software program recorded on a recording medium, such as a hard disk or a semiconductor memory. Here, the management apparatus and the like in the embodiments are implemented with the following software program.

Namely, the program is a program causing a computer to execute a management method for software versions, the management method to be executed by a version management system, the management method including: receiving request information by a first management apparatus among management apparatuses which are included in the version management system and have distributed ledgers, the request information indicating a requested version requested by a user; and storing first transaction data in the distributed ledgers through execution of a consensus algorithm by the management apparatuses, the first transaction data indicating that the user provides a predetermined number of tokens to a software developer who has developed the requested version.

Although the management methods according to one or more aspects have been described based on the embodiments, these embodiments should not be construed as limitation to the present disclosure. A variety of modifications of the present embodiments conceived by persons skilled in the art and embodiments in combination with components in different embodiments may also be included in the scope of one or more aspects without departing from the gist of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is a management method for software versions, and can be used in a management system which prevents falsification of information under management.

What is claimed is:

1. A management method for software versions, the management method to be executed by a version management system, the management method comprising:
receiving request information by a first management apparatus among management apparatuses which are included in the version management system and have distributed ledgers, the request information indicating a requested version requested by a user;
obtaining first transaction data and second transaction data, based on a predetermined distribution ratio, the first transaction data indicating that the user provides a first number of tokens to a first software developer who has developed the requested version, the second transaction data indicating that the first software developer provides a second number of tokens to a second software developer who has developed a previous version of the requested version; and
storing the first transaction data and the second transaction data in the distributed ledgers through execution of a consensus algorithm by the management apparatuses.

2. The management method according to claim 1, wherein the predetermined distribution ratio is controlled such that the second number of tokens is smaller than the first number of tokens.

3. The management method according to claim 1, wherein the second software developer includes one or more software developers who have respectively developed versions older than the requested version, the predetermined ratio is controlled such that a smaller number of tokens are distributed to a software developer of an older version.

4. The management method according to claim 1, wherein the predetermined distribution ratio is controlled such that the first number of tokens is larger than the second number of tokens.

5. The management method according to claim 1, wherein the second software developer includes one or more software developers who have respectively developed versions older than the requested version, the predetermined ratio is controlled such that a larger number of tokens are distributed to a software developer of a newer version.

6. The management method according to claim 1, wherein the predetermined distribution ratio is a distribution ratio according to a degree of contribution of the first software developer and the second software developer to development of the requested version.

7. The management method according to claim 1, wherein the first software developer is not the user.

8. A computer comprising:
a processor; and
a memory that stores a program for causing the processor to execute the method according to claim 1.

9. A non-transitory computer-readable recording medium having a program recorded thereon for causing a computer to execute the control method according to claim 1.

* * * * *